United States Patent
Georgeson et al.

(10) Patent No.: US 11,738,520 B2
(45) Date of Patent: Aug. 29, 2023

(54) END EFFECTORS AND METHODS FOR ADHESIVELY ATTACHING A FIRST PART TO A SECOND PART

(71) Applicant: The Boeing Company, Chicago, IL (US)

(72) Inventors: Gary E. Georgeson, Tacoma, WA (US); Marc J. Piehl, Renton, WA (US); Joseph L. Hafenrichter, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/494,571

(22) Filed: Oct. 5, 2021

(65) Prior Publication Data

US 2023/0104898 A1    Apr. 6, 2023

(51) Int. Cl.
*B29C 65/54* (2006.01)
*B05C 11/10* (2006.01)
*B05C 13/00* (2006.01)
*B25J 9/04* (2006.01)

(52) U.S. Cl.
CPC ........ *B29C 65/542* (2013.01); *B05C 11/1044* (2013.01); *B05C 13/00* (2013.01); *B25J 9/042* (2013.01)

(58) Field of Classification Search
USPC ..... 118/313, 315, 304, 323, 3, 21, 411–414, 118/421
See application file for complete search history.

(56) References Cited

U.S. PATENT DOCUMENTS

| | | | | |
|---|---|---|---|---|
| 4,750,960 A | * | 6/1988 | Bubeck | B65H 71/007 156/169 |
| 4,795,451 A | * | 1/1989 | Buckley | A61F 13/49466 604/385.26 |
| 8,651,046 B1 | * | 2/2014 | Davancens | B05C 5/0212 901/41 |
| 2017/0197350 A1 | * | 7/2017 | Song | B64C 1/064 |
| 2023/0103740 A1 | | 4/2023 | Hafenrichter et al. | |
| 2023/0107591 A1 | | 4/2023 | Georgeson et al. | |
| 2023/0107716 A1 | | 4/2023 | Georgeson et al. | |

* cited by examiner

*Primary Examiner* — Yewebdar T Tadesse
(74) *Attorney, Agent, or Firm* — Kunzler Bean & Adamson

(57) ABSTRACT

An end effector, for adhesively attaching a first part to a second part, comprises a support and a first nozzle, coupled to the support and movable relative to the support, and a second nozzle, coupled to the support and movable relative to the support. The first nozzle comprises a first-nozzle body, comprising a first-nozzle-body outlet port and a first-nozzle separator plate, extending from the first-nozzle body. The second nozzle comprises a second-nozzle body, comprising a second-nozzle-body inlet port and a second-nozzle separator plate, extending from the second-nozzle body. The end effector further comprises a roller, coupled to the support, rotatable relative to the support about a roller axis, and located between the first nozzle and the second nozzle.

20 Claims, 18 Drawing Sheets

First-Arm Engaged Position

Second-Arm Engaged Position

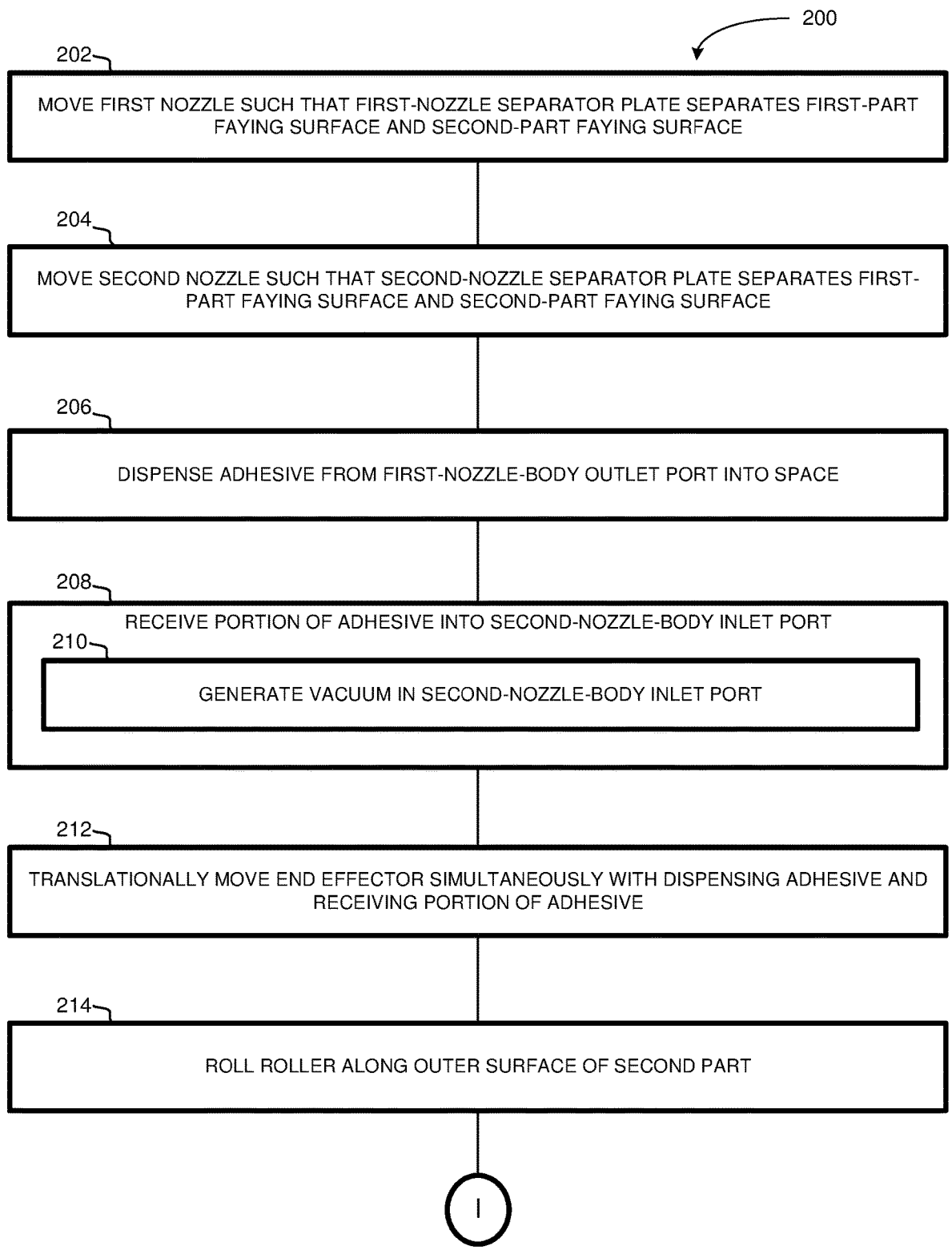

US 11,738,520 B2

END EFFECTORS AND METHODS FOR ADHESIVELY ATTACHING A FIRST PART TO A SECOND PART

TECHNICAL FIELD

Described herein are end effectors and methods for adhesively attaching a first part to a second part.

BACKGROUND

During assembly of structures, such as aircraft or components thereof, parts are often adhesively interconnected. It is desirable to fully automate deposition of adhesive between the parts, being interconnected, to reduce manufacturing lead time and cost. However, the need for creating and maintaining a properly sized gap between faying surfaces of the parts for receiving the adhesive complicates the task of automating the deposition of adhesive between the faying surfaces. Automated deposition of adhesive is further complicated by the fact that propagation of the adhesive between the parts must often be controlled to prevent the adhesive from being deposited in locations where its presence is undesirable or unnecessary.

SUMMARY

Accordingly, apparatuses and methods, intended to address at least the above-identified concerns, would find utility.

The following is a non-exhaustive list of examples of the subject matter, disclosed herein.

Disclosed herein is an end effector for adhesively attaching a first part to a second part, the end effector comprises a support and a first nozzle. The first nozzle is coupled to the support and is movable relative to the support. The first nozzle comprises a first-nozzle body, comprising a first-nozzle-body outlet port. The first nozzle also comprises a first-nozzle separator plate, extending from the first-nozzle body. The end effector also comprises a second nozzle, coupled to the support and movable relative to the support. The second nozzle comprises a second-nozzle body, comprising a second-nozzle-body inlet port. The second nozzle also comprises a second-nozzle separator plate, extending from the second-nozzle body. The end effector further comprises a roller, coupled to the support, rotatable relative to the support about a roller axis, and located between the first nozzle and the second nozzle.

The end effector provides for depositing the adhesive, through the first-nozzle-body outlet port, into the space between the first part and the second part, and promoting uniform distribution of the adhesive in the space by receiving a portion of the deposited adhesive into the second-nozzle-body inlet port. Receiving the portion of the deposited adhesive into the second-nozzle-body inlet port enables uniform distribution of the adhesive throughout the space by promoting flow of the adhesive between the first part and the second part from one side of the space to the opposite side of the space. The first-nozzle separator plate and the second-nozzle separator plate promote separation between the first part and the second part to create the space. The first-nozzle-body outlet port and the first-nozzle separator plate enable the adhesive to be deposited, through the first-nozzle-body outlet port, into the space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. In contrast, the second-nozzle-body inlet port and the second-nozzle separator plate enable the adhesive, deposited through the first-nozzle-body outlet port to be urged (e.g., drawn via a suction force) from the space into the second-nozzle-body inlet port when the second-nozzle separator plate is located between and is separating the first part and the second part. Accordingly, a configuration of the second-nozzle-body inlet port and the second-nozzle separator plate maintains separation between the first part and the second part as a portion of the adhesive, deposited into the space, is urged out of the space through the second-nozzle-body inlet port. The roller helps prevent movement of the second part away from the first part beyond a predetermined distance when the adhesive is being dispensed between the first part and the second part. Accordingly, the roller provides a force, directed toward the first part, against the second part that counters a force, directed away from the first part, generated by the adhesive filling the space between the first part and the second part, which helps to keep a thickness of the space, when filled, below a maximum thickness. Additionally, the roller, being rotatable relative to the support, enables the roller to roll along the second part as the end effector moves relative to the first part and the second part. The roller can be fixed to the support, such that the roller cannot translationally move relative to the support.

Also disclosed herein is a method of using end effector adhesively attaching the first part, which comprises a first-part faying surface, to the second part, which comprises a second-part faying surface. The method comprises moving the first nozzle relative to the support such that the first-nozzle separator plate is inserted between and separates the first-part faying surface and the second-part faying surface. The method also comprises moving the second nozzle relative to the support such that the second-nozzle separator plate is inserted between and separates the first-part faying surface and the second-part faying surface. The method further comprises, with the first-nozzle separator plate inserted between and separating the first-part faying surface and the second-part faying surface, dispensing a volume of adhesive into a space, defined between the first-part faying surface and the second-part faying surface, in a flow direction from the first-nozzle-body outlet port to the second-nozzle-body inlet port. The method additionally comprises, with the second-nozzle separator plate inserted between and separating the first-part faying surface and the second-part faying surface, receiving a portion of the volume of adhesive into the second-nozzle-body inlet port.

The method facilitates depositing the adhesive through the first-nozzle-body outlet port into the space between the first part and the second part. Inserting the first-nozzle separator plate between the first-part faying surface and the second-part faying surface acts as a wedge to facilitate separation between the first part and the second part to help create the space. Similarly, inserting the second-nozzle separator plate between the first-part faying surface and the second-part faying surface promotes separation between the first part and the second part to help create the space in a similar manner. The first-nozzle-body outlet port and the first-nozzle separator plate enable the adhesive to be deposited, through the first-nozzle-body outlet port, into the space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. In contrast, the second-nozzle-body inlet port and the second-nozzle separator plate enable the adhesive to be received, into the second-nozzle-body inlet port, from the space when the second-nozzle separator plate is located between and is separating the first part and the second part. Accordingly, a configuration of the second-nozzle-body inlet port and the second-nozzle separator plate maintains separation between the first part and the second part as the adhesive is received, into the second-nozzle-body inlet port. Receiving the portion of the deposited adhesive into the second-nozzle-body inlet port enables uniform distribution of the adhesive throughout the space by promoting flow of the adhesive from one side of the space between the first part and the second part to the opposite side of the space.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 16A and 16B, collectively, are a block diagram of a method, according to one or more examples of the subject matter, disclosed herein, of adhesively attaching a first part to a second part utilizing the end effector of FIG. 1, according to one or more examples of the subject matter, disclosed herein.

DETAILED DESCRIPTION

Figure 1:
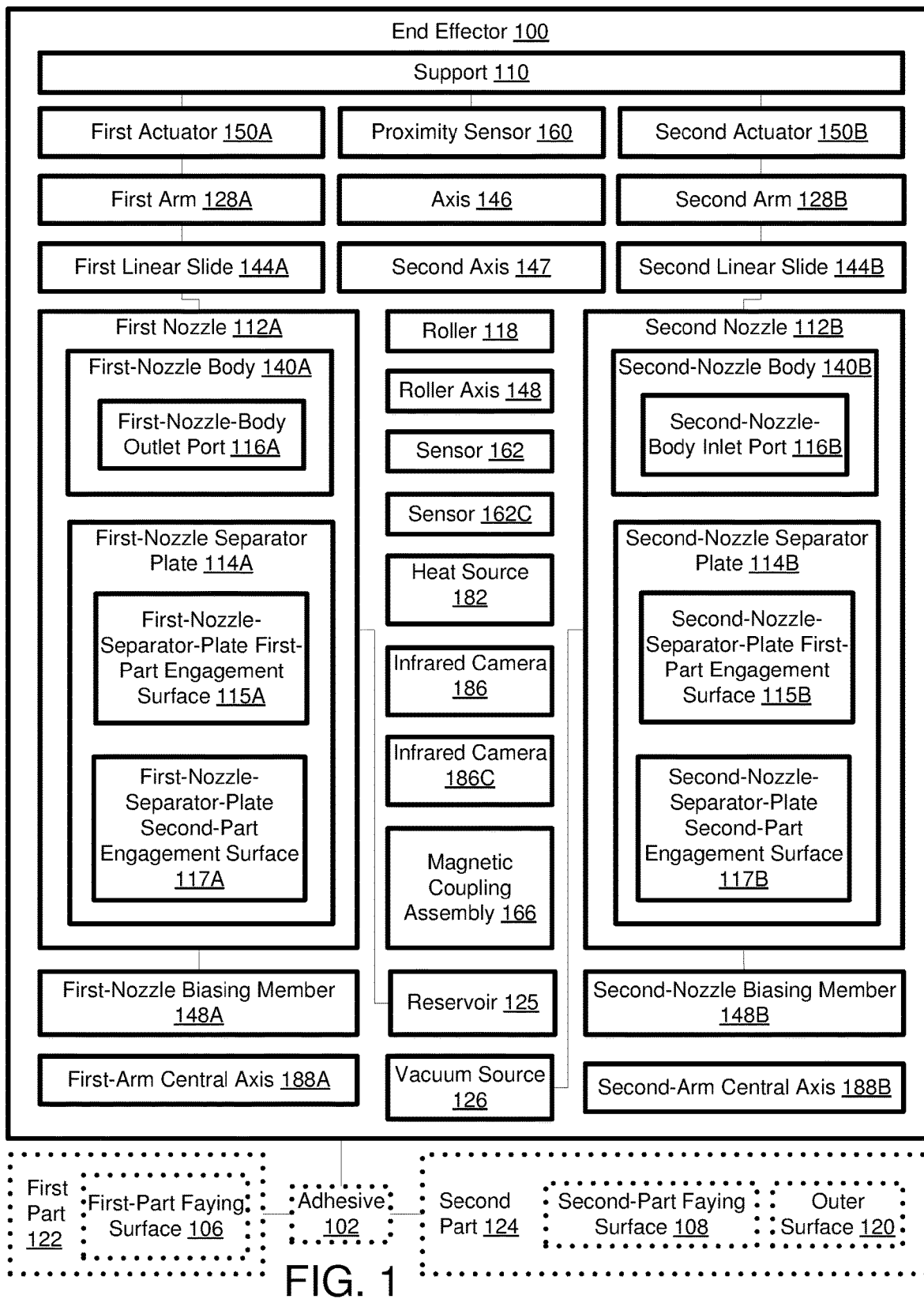
FIG. 1 is a block diagram of an end effector for adhesively attaching a first part to a second part, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 16B:
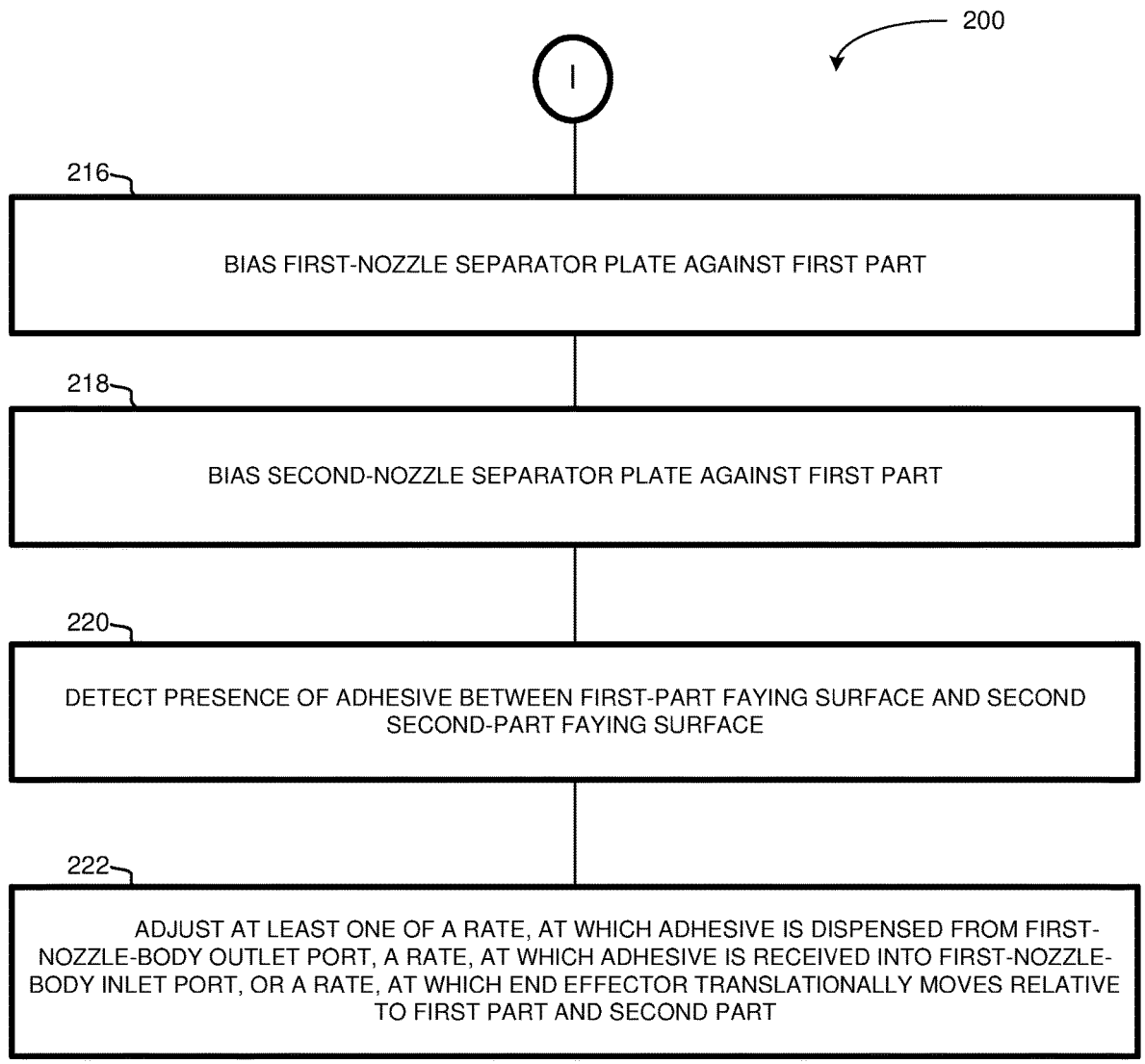

In FIGS. 16A and 16B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16A and 16B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2A-15 for illustrative purposes only and not by way of limitation, the following portion of this paragraph delineates example 1 of the subject matter, disclosed herein. According to example 1, end effector 100 for adhesively attaching first part 122 to second part 124 comprises support 110. End effector 100 also comprises first nozzle 112A, coupled to support 110 and movable relative to support 110. First nozzle 112A comprises first-nozzle body 140A, comprising first-nozzle-body outlet port 116A. First nozzle 112A also comprises first-nozzle separator plate 114A, extending from first-nozzle body 140A. End effector 100 further comprises second nozzle 112B, coupled to support 110 and movable relative to support 110. Second nozzle 112B comprises second-nozzle body 140B, comprising second-nozzle-body inlet port 116B. Second nozzle 112B additionally comprises second-nozzle separator plate 114B, extending from second-nozzle body 140B. End effector 100 further comprises roller 118, coupled to support 110, rotatable relative to support 110 about roller axis 148, and located between first nozzle 112A and second nozzle 112B.

End effector 100 provides for depositing adhesive 102, through first-nozzle-body outlet port 116A, into a space (e.g., space 104) between first part 122 and second part 124, and promoting uniform distribution of adhesive 102 in space 104 by receiving a portion of adhesive 102 into second-nozzle-body inlet port 116B. Receiving the portion of adhesive 102 into second-nozzle-body inlet port 116B enables uniform distribution of adhesive 102 throughout space 104 by promoting flow of adhesive 102 between first part 122 and second part 124 from one side of space 104 to an opposite side of space 104. First-nozzle separator plate 114A and second-nozzle separator plate 114B promote separation between first part 122 and second part 124 to create space 104. First-nozzle-body outlet port 116A and first-nozzle separator plate 114A enable adhesive 102 to be deposited, through first-nozzle-body outlet port 116A, into space 104 when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as adhesive 102 is deposited, through first-nozzle-body outlet port 116A, between first part 122 and second part 124. In contrast, second-nozzle-body inlet port 116B and second-nozzle separator plate 114B enable adhesive 102, deposited through first-nozzle-body outlet port 116A to be urged (e.g., drawn via a suction force) from space 104 into second-nozzle-body inlet port 116B when second-nozzle separator plate 114B is located between and is separating first part 122 and second part 124. Accordingly, a configuration of second-nozzle-body inlet port 116B and second-nozzle separator plate 114B maintains separation between first part 122 and second part 124 as a portion of adhesive 102, deposited into space 104, is urged out of space 104 through second-nozzle-body inlet port 116B. Roller 118 helps prevent movement of second part 124 away from first part 122 beyond a predetermined distance when adhesive 102 is being dispensed between first part 122 and second part 124. Accordingly, roller 118 provides a force, directed toward first part 122, against second part 124 that counters a force, directed away from first part 122, generated by adhesive 102 filling space 104 between first part 122 and second part 124, which helps to keep a thickness of space 104, when filled, below a maximum thickness. Additionally, roller 118, being rotatable relative to support 110, enables roller 118 to roll along second part 124 as end effector 100 moves relative to first part 122 and second part 124. Roller 118 can be fixed to support 110, such that roller 118 cannot translationally move relative to support 110.

Generally, end effector 100 functions as an automated end effector that is operably coupled with an end of a robot (not shown) or other robotic arm mechanism and that is designed to interact with the environment by depositing adhesive 102 between first part 122 and second part 124 and removing a portion of adhesive 102 from between first part 122 and second part 124.

In some examples, first-nozzle separator plate 114A is made of a material that is more flexible than a material of first part 122 and a material of second part 124, which promotes compliancy of first-nozzle separator plate 114A when inserting first-nozzle separator plate 114A between first part 122 and second part 124. Similarly, in some examples, second-nozzle separator plate 114B is made of a material that is more flexible than the material of first part 122 and the material of second part 124, which promotes compliancy of second-nozzle separator plate 114B when inserting second-nozzle separator plate 114B between first part 122 and second part 124.

According to certain examples, each one of first-nozzle separator plate 114A and second-nozzle separator plate 114B includes a beveled tip portion, which promotes ease in inserting first-nozzle separator plate 114A and second-nozzle separator plate 114B between first part 122 and second part 124.

In certain examples, adhesive 102 is one of an epoxy adhesive, a polyurethane adhesive, polyamide adhesives, or the like. Moreover, when delivered to and through first-nozzle-body outlet port 116A, and when received into and removed from second-nozzle-body inlet port 116B, adhesive 102 is in a flowable state, such as a glutinous, viscous, or extrudable state). After being deposited between first part 122 and second part 124, adhesive is allowed to harden (e.g., via curing or air drying) to form the adhesive bond between first part 122 and second part 124.

Referring generally to FIG. 1 and particularly to, e.g., FIGS. 2A-6 and 12-15 for illustrative purposes only and not by way of limitation, the following portion of this paragraph delineates example 2 of the subject matter, disclosed herein. According to example 2, which encompasses example 1, above, end effector 100 further comprises first-nozzle biasing member 148A, which is configured to bias first nozzle 112A away from support 110. End effector 100 also comprises second-nozzle biasing member 148B, which is configured to bias second nozzle 112B away from support 110.

First-nozzle biasing member 148A, being configured to bias first nozzle 112A away from support 110, and second-nozzle biasing member 148B, being configured to bias second nozzle 112B away from support 110, promotes constant engagement of first-nozzle separator plate 114A and second-nozzle separator plate 114B, respectively, with first part 122, as end effector 100 moves relative to first part 122 and second part 124, and as adhesive 102 is dispensed through first-nozzle-body outlet port 116A and received into second-nozzle-body inlet port 116B. In some examples, when engaged with first part 122, first-nozzle separator plate 114A and second-nozzle separator plate 114B are flush against first part 122.

As used herein, "to bias" means to continuously apply a force, which may or may not have a constant magnitude, but is always applied in the same direction and has a magnitude greater than zero.

Referring generally to FIG. 1 and particularly to, e.g., FIGS. 2A-6 and 12-15 for illustrative purposes only and not by way of limitation, the following portion of this paragraph delineates example 3 of the subject matter, disclosed herein. According to example 3, which encompasses example 1 or 2, above, end effector 100 further comprises first arm 128A, which couples first nozzle 112A to support 110. End effector 100 additionally comprises second arm 128B, which couples second nozzle 112B to support 110. First arm 128A is movable, relative to support 110, such that first arm 128A is selectively movable to one of a first-arm disengaged position or a first-arm engaged position. Second arm 128B is movable, relative to support 110, such that second arm 128B is selectively movable to one of a second-arm disengaged position or a second-arm engaged position. First-nozzle separator plate 114A is closer to second-nozzle separator plate 114B when first arm 128A is in the first-arm engaged position, and second arm 128B is in the second-arm engaged position, than when first arm 128A is in the first-arm disengaged position, and second arm 128B is in the second-arm disengaged position.

First arm 128A, being selectively movable to move first arm 128A to one of the first-arm disengaged position or the first-arm engaged position, enables first-nozzle separator plate 114A to be selectively insertable into or retractable out from space 104 between first part 122 and second part 124 independent of movement of support 110. Similarly, second arm 128B, being selectively movable to move second arm 128B to one of the second-arm disengaged position or the second-arm engaged position, enables second-nozzle separator plate 114B to be selectively insertable into or retractable out from space between first part 122 and second part 124 independent of movement of support 110. First-nozzle separator plate 114A, being closer to second-nozzle separator plate 114B, when first arm 128A is in the first-arm engaged position and second arm 128B is in the second-arm engaged position than when first arm 128A is in the first-arm disengaged position and second arm 128B is in the second-arm disengaged position, provides end effector 100 with more freedom for maneuvering, relative to first part 122 and second part 124, as end effector 100 approaches first part 122 and second part 124 to dispense adhesive 102 between first part 122 and second part 124 and to receive a portion of adhesive 102 from between first part 122 and second part 124, and as end effector 100 is moved away from first part 122 and second part 124 after adhesive 102 has been dispensed between first part 122 and second part 124 and after a portion of adhesive 102 has been removed from between first part 122 and second part 124.

Referring generally to FIG. 1 and particularly to, e.g., FIGS. 2A-6 and 12-15 for illustrative purposes only and not by way of limitation, the following portion of this paragraph delineates example 4 of the subject matter, disclosed herein. According to example 4, which encompasses example 3, above, first arm 128A has first-arm central axis 188A. First arm 128A is pivotable, relative to support 110, so that first-arm central axis 188A lies in a first virtual plane. Second arm 128B has second-arm central axis 188B. Second arm 128B is pivotable, relative to support 110, so that second-arm central axis 188B lies in a second virtual plane.

First arm 128A, being pivotable relative to support 110 so that first-arm central axis 188A lies in the first virtual plane, and second arm 128B, being pivotable relative to support 110 so that second-arm central axis 188B lies in the second virtual plate, promotes an easily controllable, simple, and efficient movement of first arm 128A and second arm 128B relative to support 110.

In some examples, the subject matter, disclosed herein includes axes, planes, and rays. Such axes, planes, and rays, unless otherwise indicated, are virtual imaginary features, used to define certain aspects of the subject matter. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities can be defined.

Referring generally to FIG. 1 and particularly to, e.g., FIGS. 2A, 3-6, and 12-15 for illustrative purposes only and not by way of limitation, the following portion of this paragraph delineates example 5 of the subject matter, disclosed herein. According to example 5, which encompasses example 4, above, end effector 100 further comprises axis 146, which is perpendicular to the first virtual plane and to the second virtual plane. First arm 128A and second arm 128B are pivotable, relative to support 110, about axis 146.

First arm 128A and second arm 128B, being pivotable, relative to support 110, about axis 146 promotes simple and reliable positioning of first nozzle 112A and second nozzle 112B relative to each other.

Figure 2A:
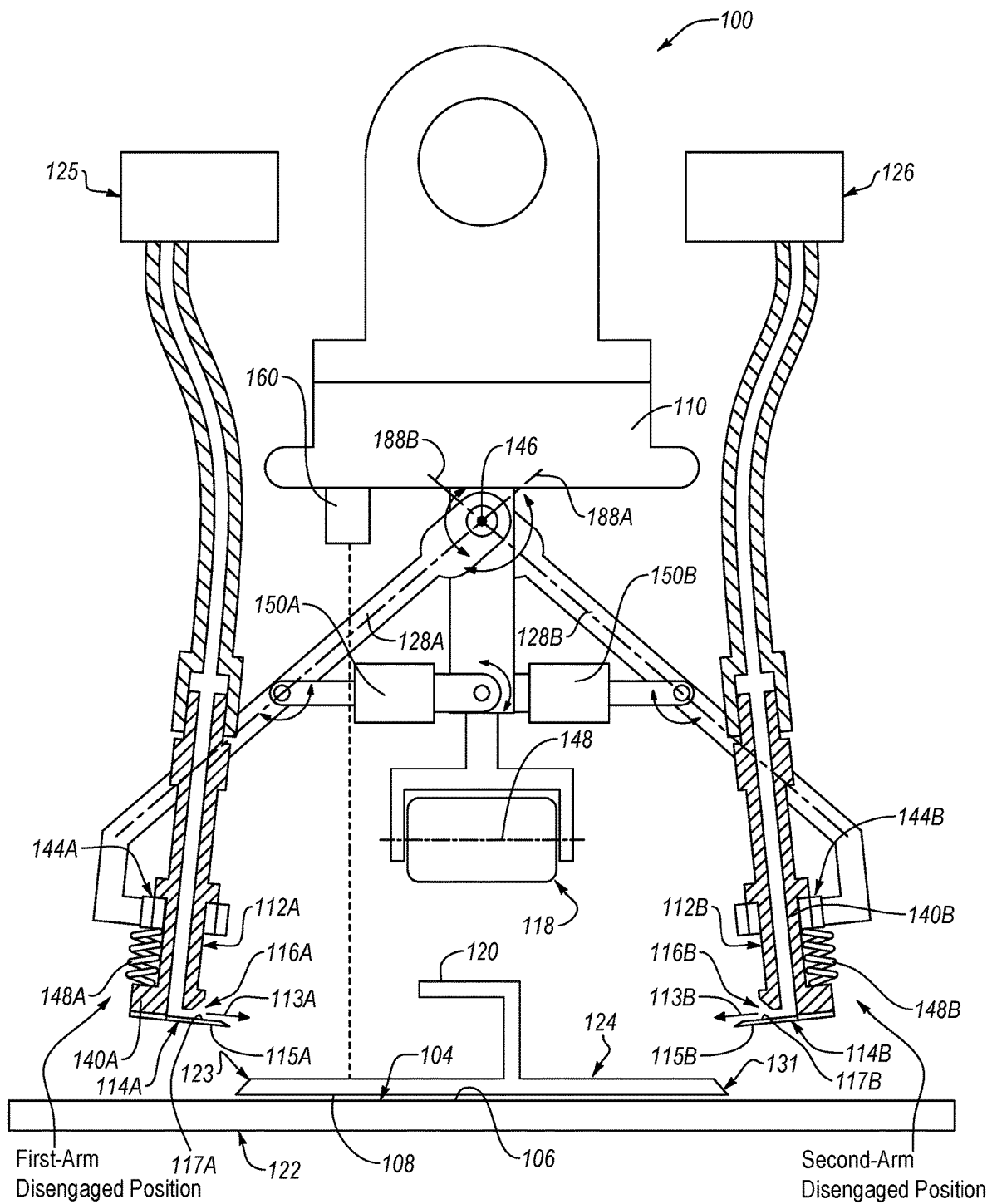
FIG. 2A is a schematic, elevation, sectional view of the end effector of FIG. 1, according to one or more examples of the subject matter, disclosed herein.
Figure 2B:
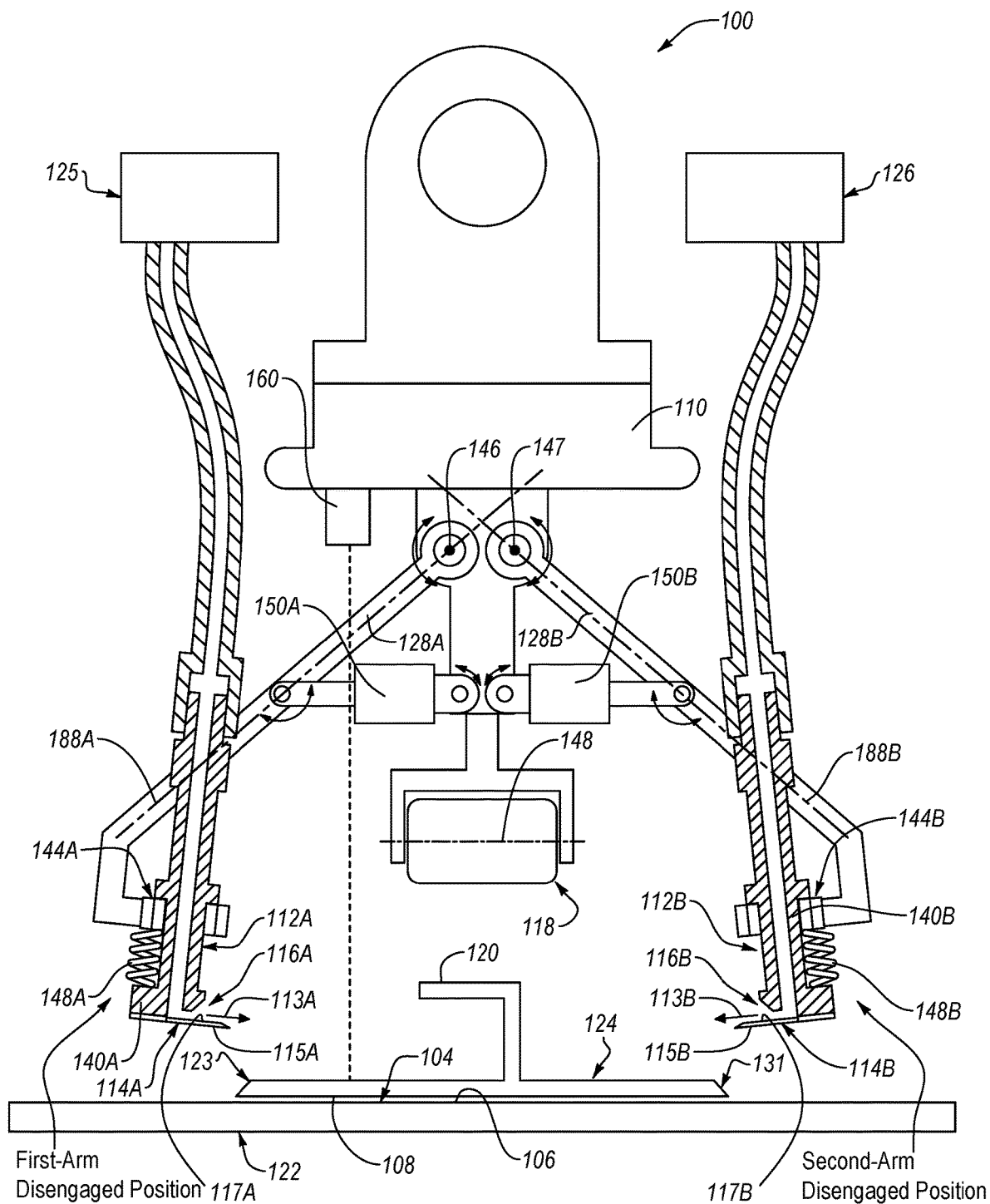
FIG. 2B is a schematic, elevation, sectional view of the end effector of FIG. 1, according to one or more examples of the subject matter, disclosed herein.
Figure 3:
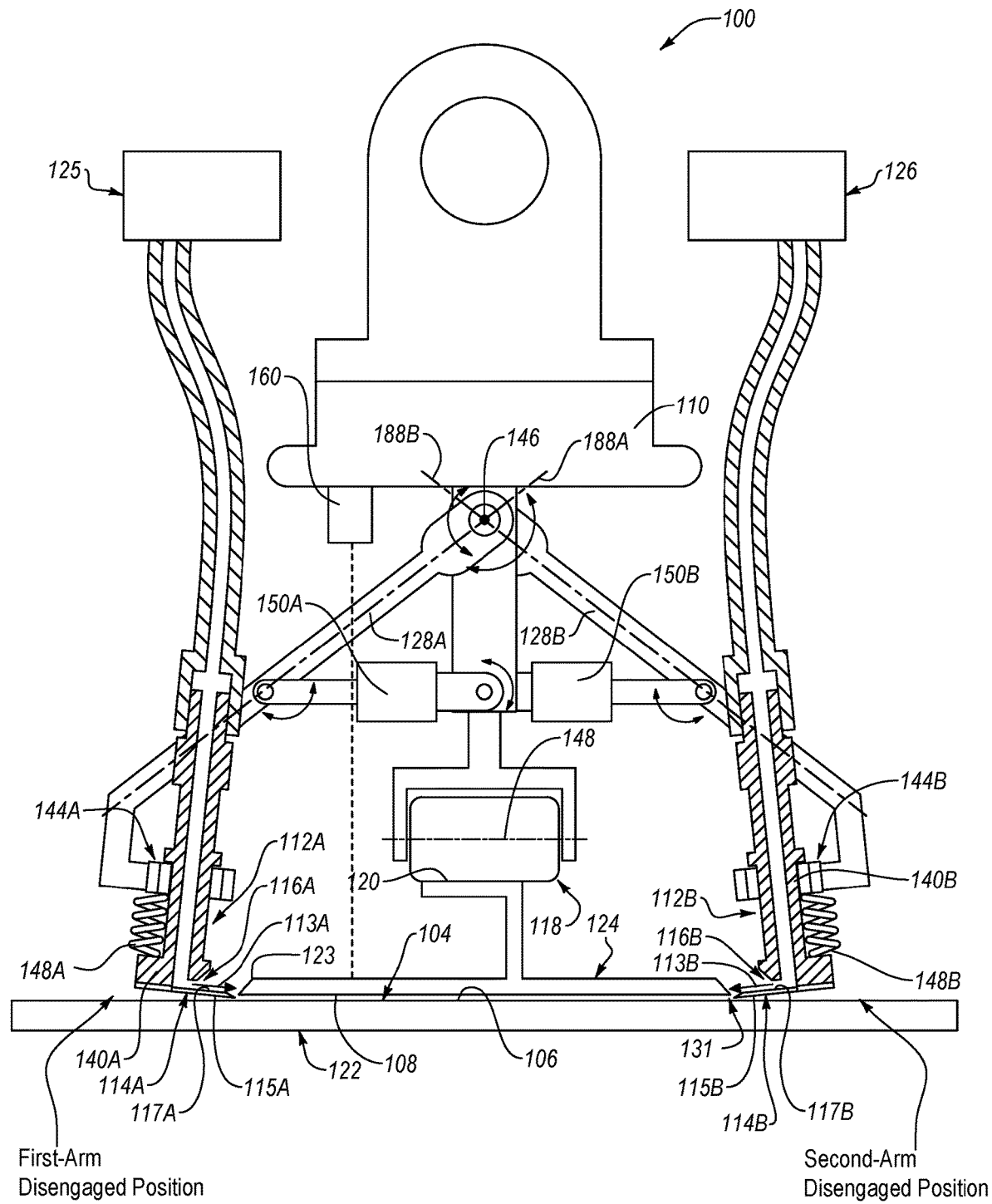
FIG. 3 is a schematic, elevation, sectional view of the end effector of FIG. 1, according to one or more examples of the subject matter, disclosed herein.

Referring generally to FIG. 1 and particularly to, e.g., FIG. 2B for illustrative purposes only and not by way of limitation, the following portion of this paragraph delineates example 6 of the subject matter, disclosed herein. According to example 6, which encompasses example 4, above, end effector 100 further comprises axis 146, which is perpendicular to the first virtual plane. End effector 100 also comprises second axis 147, which is perpendicular to the second virtual plane. First arm 128A is pivotable, relative to support 110, about axis 146. Second arm 128B is pivotable, relative to support 110, about second axis 147. Axis 146 and second axis 147 are parallel to each other.

Axis 146 and second axis 147, being parallel to each other, enable the pivot point of first arm 128A to be closer to first side 123 of second part 124 and enable the pivot point of second arm 128B to be closer to second side 131 of second part 124, which promotes insertion of first-nozzle separator plate 114A and second-nozzle separator plate 114B into space 104 between first part 122 and second part 124 at a flatter angle to reduce binding of first-nozzle separator plate 114A and second-nozzle separator plate with first part 122.

Referring generally to FIG. 1 and particularly to, e.g., FIGS. 2A-6 and 12-15 for illustrative purposes only and not by way of limitation, the following portion of this paragraph delineates example 7 of the subject matter, disclosed herein. According to example 7, which encompasses any one of examples 4 to 6, above, the first virtual plane and the second virtual plane are parallel to each other.

The first virtual plane and the second virtual plane, being parallel to each other, enables first nozzle 112A and second nozzle 112B to be offset in a direction, parallel with axis 146. Enabling first nozzle 112A and second nozzle 112B to be offset enables second-nozzle-body inlet port 116B to lag behind first-nozzle-body outlet port 116A as end effector 100 is moved along first part 122 and second part 124. Lagging second-nozzle-body inlet port 116B behind first-nozzle-body outlet port 116A enables second-nozzle-body inlet port 116B to be suitably positioned to receive a portion of adhesive 102 after being delivered into space 104 from first-nozzle-body outlet port 116A and after flowing through space 104.

Referring generally to FIG. 1 and particularly to, e.g., FIGS. 2A-6 and 12-15 for illustrative purposes only and not by way of limitation, the following portion of this paragraph delineates example 8 of the subject matter, disclosed herein. According to example 8, which encompasses any one of examples 4 to 6, above, the first virtual plane and the second virtual plane are coincident with each other.

The first virtual plane and the second virtual plane, being coincident with each other, enable first arm 128A and second arm 128B to move along a common plane, which promotes alignment between first nozzle 112A and second nozzle 112B as first arm 128A and second arm 128B move, and as adhesive 102 is dispensed through first-nozzle-body outlet port 116A and second-nozzle-body inlet port 116B.

Referring generally to FIG. 1 and particularly to, e.g., FIGS. 2A-6 and 12-15 for illustrative purposes only and not by way of limitation, the following portion of this paragraph delineates example 9 of the subject matter, disclosed herein. According to example 9, which encompasses any one of examples 4 to 8, above, at least one of the first virtual plane and the second virtual plane is parallel to a virtual plane, containing roller axis 148, or is coincident with the virtual plane, containing roller axis 148.

At least one of the first virtual plane and the second virtual plane, being parallel to a virtual plane, containing roller axis 148, or being coincident with the virtual plane, containing roller axis 148, enables first nozzle 112A and second nozzle 112B to be moved away from and toward second part 124 when roller 118 is oriented by end effector 100 to roll along second part 124.

Referring generally to FIG. 1 and particularly to, e.g., FIGS. 2A-6 and 12-15 for illustrative purposes only and not by way of limitation, the following portion of this paragraph delineates example 10 of the subject matter, disclosed herein. According to example 10, which encompasses any one of examples 3 to 9, above, end effector 100 further comprises first-nozzle biasing member 148A, which is configured to bias first nozzle 112A away from support 110. End effector 100 also comprises second-nozzle biasing member 148B, which is configured to bias second nozzle 112B away from support 110.

First-nozzle biasing member 148A, being configured to bias first nozzle 112A away from support 110, and second-nozzle biasing member 148B, being configured to bias second nozzle 112B away from support 110, promotes constant engagement of first-nozzle separator plate 114A and second-nozzle separator plate 114B, respectively, with first part 122, as end effector 100 moves relative to first part 122 and second part 124, and as adhesive 102 is dispensed through first-nozzle-body outlet port 116A and received into second-nozzle-body inlet port 116B. In some examples, when engaged with first part 122, first-nozzle separator plate 114A and second-nozzle separator plate 114B are flush against first part 122.

Referring generally to FIG. 1 and particularly to, e.g., FIGS. 2A-6 and 12-15 for illustrative purposes only and not by way of limitation, the following portion of this paragraph delineates example 11 of the subject matter, disclosed herein. According to example 11, which encompasses example 10, above, first-nozzle biasing member 148A is a compression spring, which is coupled to first nozzle 112A and to first arm 128A. Second-nozzle biasing member 148B is a compression spring, which is coupled to second nozzle 112B and to second arm 128B.

First-nozzle biasing member 148A, being coupled to first nozzle 112A and to first arm 128A, enables first nozzle 112A to be biased relative to first arm 128A, which helps in achieving a controlled initial engagement between first-nozzle separator plate 114A and first part 122 as first arm 128A is moved into the first-arm engaged position, and helps to keep first-nozzle separator plate 114A in contact with first part 122 as adhesive 102 is being dispensed. Similarly, second-nozzle biasing member 148B, being coupled to second nozzle 112B and to second arm 128B, enables second nozzle 112B to be biased relative to second arm 128B, which helps in achieving a controlled initial engagement between second-nozzle separator plate 114B and first part 122 as second arm 128B is moved into the second-arm engaged position, and helps to keep second-nozzle separator plate 114B in contact with first part 122 as adhesive is being dispensed. Compression springs provide a simple, predictable, and reliable means for biasing first nozzle 112A and second nozzle 112B away from support 110. Additionally, compression springs reduce complexity and reduce spatial constraints by moving spring connection points away from first-nozzle-body outlet port 116A and second-nozzle-body inlet port 116B. However, in some example, each one of first-nozzle biasing member 148A and second-nozzle biasing member 148B is a different type of biasing member, such as a tension spring.

Referring generally to FIG. 1 and particularly to, e.g., FIGS. 2A-6 and 12-15 for illustrative purposes only and not by way of limitation, the following portion of this paragraph delineates example 12 of the subject matter, disclosed herein. According to example 12, which encompasses any one of examples 3 to 11 above, first-nozzle-body outlet port 116A is open in a first direction. Second-nozzle-body inlet port 116B is open in one of a second direction or a third direction. When first arm 128A is in the first-arm engaged position, and when second arm 128B is in the second-arm engaged position, first nozzle 112A and second nozzle 112B are oriented relative to each other such that first virtual ray 113A, corresponding with the first direction, is directed toward and is co-planar with second virtual ray 113B, corresponding with the second direction, and is perpendicular with third virtual ray 113C, corresponding with the third direction.

Orienting first nozzle 112A and second nozzle 112B relative to each other, such that, when first arm 128A is in the first-arm engaged position and when second arm 128B is in second-arm engaged position, first virtual ray 113A is directed toward and is co-planar with second virtual ray 113B and perpendicular with third virtual ray 113C, promotes an efficient and uniform flow of adhesive 102 between first part 122 and second part 124 from one side of second part 124 to an opposite side of second part 124.

Referring generally to FIG. 1 and particularly to, e.g., FIGS. 2A-6 and 12-15 for illustrative purposes only and not by way of limitation, the following portion of this paragraph delineates example 13 of the subject matter, disclosed herein. According to example 13, which encompasses example 12, above, end effector 100 further comprises reservoir 125, which is fluidically coupled with first nozzle 112A. End effector 100 also comprises vacuum source 126, which is fluidically coupled with second nozzle 112B.

Reservoir 125, being fluidically coupled with first nozzle 112A, enables adhesive 102 to be delivered to first-nozzle-body outlet port 116A for deposition into space 104 between first part 122 and second part 124. Vacuum source 126, being fluidically coupled with second nozzle 112B, provides a suction force at second-nozzle-body inlet port 116B for receiving a portion of adhesive 102 in space 104.

Figure 7:
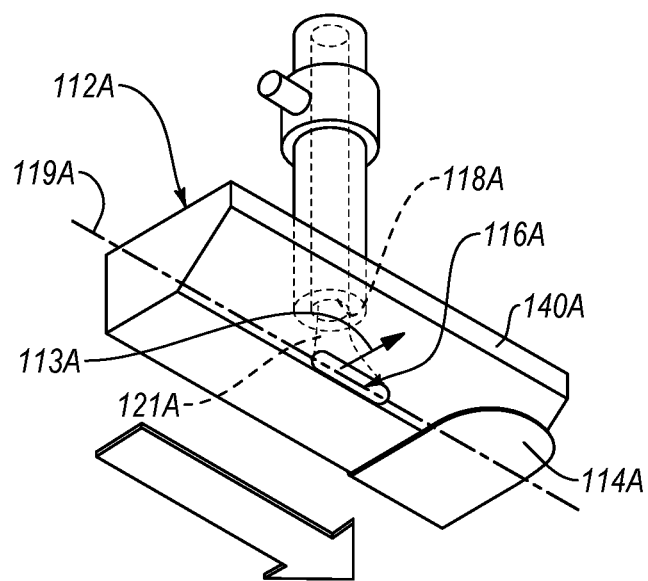
FIG. 7 is a schematic, perspective view of a first nozzle of the apparatus of FIG. 1, according to one or more examples of the subject matter, disclosed herein.
Figure 8:
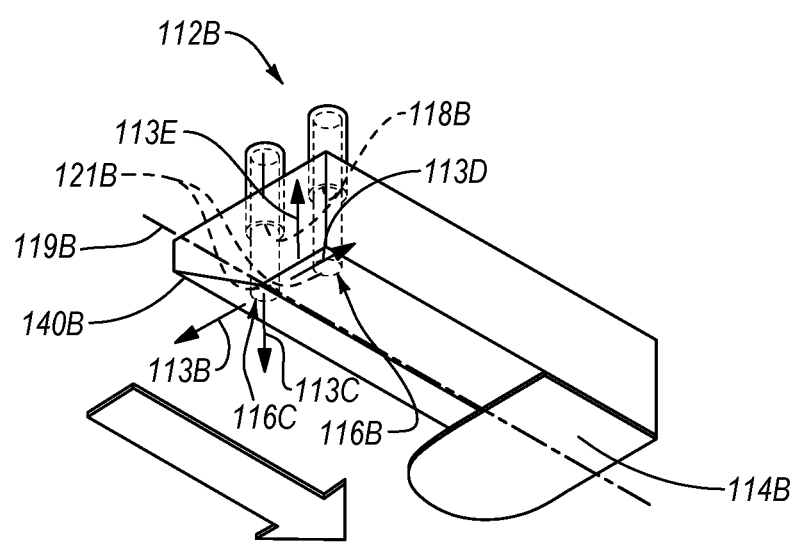
FIG. 8 is a schematic, perspective view of a second nozzle of the apparatus of FIG. 1, according to one or more examples of the subject matter, disclosed herein.

In some examples, first nozzle 112A and second nozzle 112B are fluidically coupled with reservoir 125 and vacuum source 126 via respective tubes, which are flexible, in some examples. Flexible tubes enable first nozzle 112A and second nozzle 112B to move relative to reservoir 125 and vacuum source 126, respectively. Reservoir 125 enables adhesive 102 to be dispensed from first-nozzle-body outlet port 116A. Vacuum source 126 enables adhesive 102 to be received in second-nozzle-body inlet port 116B. Referring to FIG. 7, first-nozzle body 140A further comprises first-nozzle-body inlet port 118A and first-nozzle-body channel 121A. First-nozzle-body channel 121A extends through first-nozzle body 140A and fluidically couples together first-nozzle-body inlet port 118A and first-nozzle-body outlet port 116A, such that adhesive 102 from reservoir 125 flows into first-nozzle-body inlet port 118A, through first-nozzle-body channel 121A, and to first-nozzle-body outlet port 116A. Referring to FIG. 8, second-nozzle body 140B further comprises at least one second-nozzle-body outlet port 118B and at least one second-nozzle-body channel 121B. Second-nozzle-body channel 121B extends through second-nozzle body 140B and fluidically couples together second-nozzle-body outlet port 118B and second-nozzle-body inlet port 116B, such that a portion of adhesive 102, from between first part 122 and second part 124, flows into second-nozzle-body inlet port 116B, through second-nozzle-body channel 121B, and to second-nozzle-body outlet port 118B. Although shown as a single unit in FIGS. 2A-6 and 12-15, in one or more examples, reservoir 125 includes multiple units. Similarly, although shown as a single unit in FIGS. 2A-6 and 12-15, in one or more examples, vacuum source 126 includes multiple units. Reservoir 125 provides a source of adhesive 102, and includes a pump, in certain examples.

Referring generally to FIG. 1 and particularly to, e.g., FIGS. 8-11 for illustrative purposes only and not by way of limitation, the following portion of this paragraph delineates example 14 of the subject matter, disclosed herein. According to example 14, which encompasses example 12 or 13, above, second-nozzle body 140B further comprises second second-nozzle-body inlet port 116C. Second-nozzle-body inlet port 116B is open in the second direction. Second second-nozzle-body inlet port 116C is open in the third direction.

Second second-nozzle-body inlet port 116C, together with second-nozzle-body inlet port 116B, enables reception of portions of adhesive 102 at different locations, which helps to prevent buildup of adhesive 102 at second nozzle 112B. Moreover, second-nozzle-body inlet port 116B, being open in the second direction, and second second-nozzle-body inlet port 116C, being open in the third direction, enables second nozzle 112B to receive adhesive 102 flowing in multiple directions.

Referring generally to FIG. 1 and particularly to, e.g., FIGS. 8-11 for illustrative purposes only and not by way of limitation, the following portion of this paragraph delineates example 15 of the subject matter, disclosed herein. According to example 15, which encompasses example 14, above, second-nozzle-body inlet port 116B is offset relative to second second-nozzle-body inlet port 116C in a fourth direction, corresponding with fourth virtual ray 113D that is parallel with first virtual ray 113A.

Second-nozzle-body inlet port 116B, being offset relative to second second-nozzle-body inlet port 116C in the fourth direction, enables second nozzle 112B to receive adhesive 102 at a first location and to accommodate for overflow or buildup of adhesive 102 by receiving the excess adhesive at a second location laterally away from the first location.

Referring generally to FIG. 1 and particularly to, e.g., FIGS. 8-11 for illustrative purposes only and not by way of limitation, the following portion of this paragraph delineates example 16 of the subject matter, disclosed herein. According to example 16, which encompasses example 15, above, second-nozzle-body inlet port 116B is offset relative to second second-nozzle-body inlet port 116C in a fifth direction, corresponding with fifth virtual ray 113E that is perpendicular with fourth virtual ray 113D.

Second-nozzle-body inlet port 116B, being offset relative to second second-nozzle-body inlet port 116C in the fifth direction, enables second nozzle 112B to receive adhesive 102 at a first location and to accommodate for overflow or buildup of adhesive 102 by receiving the excess adhesive at a third location vertically disparate from the first location.

Figure 4:
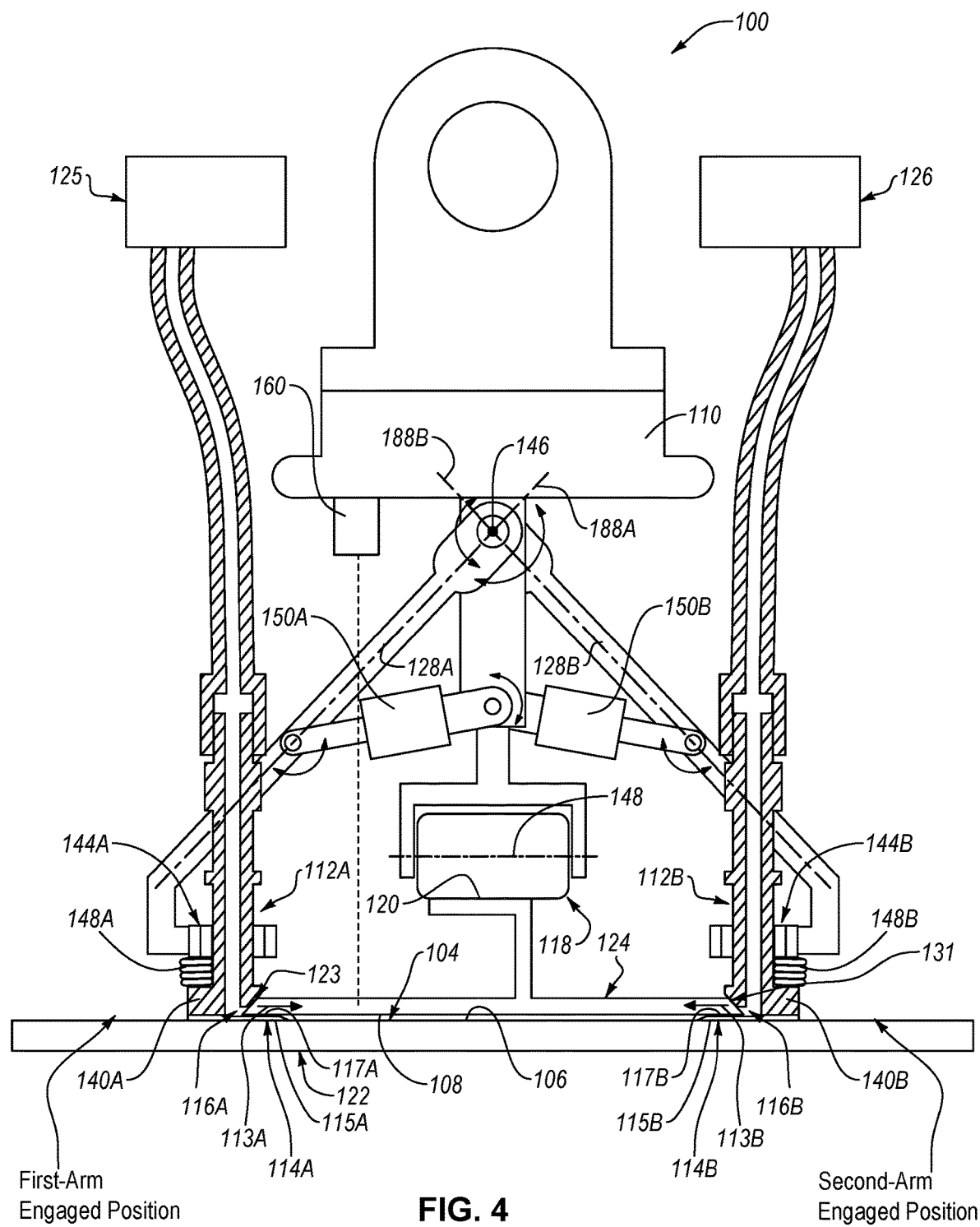
FIG. 4 is a schematic, elevation, sectional view of the end effector of FIG. 1, according to one or more examples of the subject matter, disclosed herein.
Figure 5:
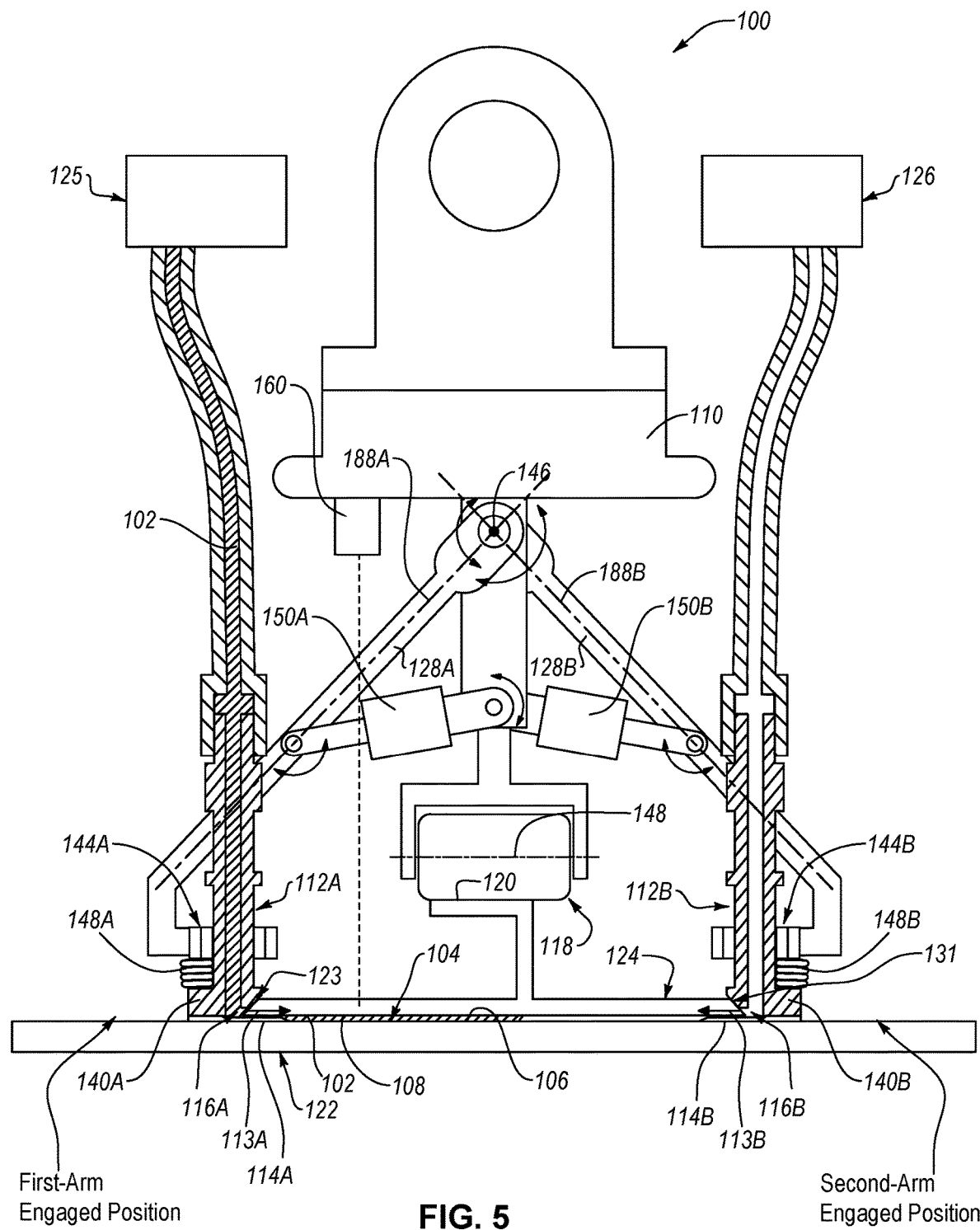
FIG. 5 is a schematic, elevation, sectional view of the end effector of FIG. 1, according to one or more examples of the subject matter, disclosed herein.
Figure 6:
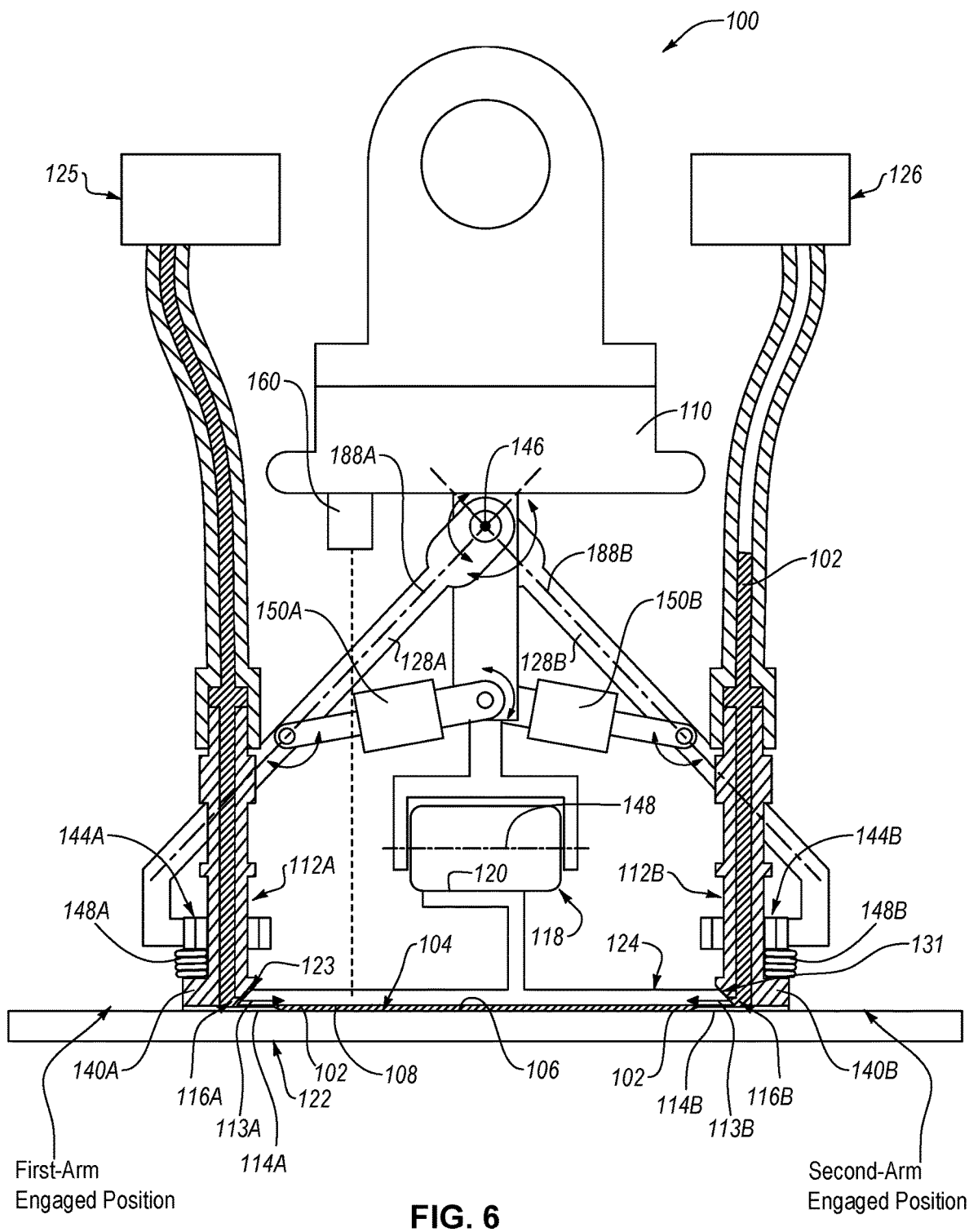
FIG. 6 is a schematic, elevation, sectional view of the end effector of FIG. 1, according to one or more examples of the subject matter, disclosed herein.

Referring generally to FIG. 1 and particularly to, e.g., FIGS. 2A and 4 for illustrative purposes only and not by way of limitation, the following portion of this paragraph delineates example 17 of the subject matter, disclosed herein. According to example 17, which encompasses any one of examples 3 to 16 above, first-nozzle separator plate 114A comprises first-nozzle-separator-plate first-part engagement surface 115A and first-nozzle-separator-plate second-part engagement surface 117A. First-nozzle-separator-plate first-part engagement surface 115A and first-nozzle-separator-plate second-part engagement surface 117A are parallel to each other. Second-nozzle separator plate 114B comprises second-nozzle-separator-plate first-part engagement surface 115B and second-nozzle-separator-plate second-part engagement surface 117B. Second-nozzle-separator-plate first-part engagement surface 115B and second-nozzle-separator-plate second-part engagement surface 117B are parallel to each other. When first arm 128A is in the first-arm disengaged position, and second arm 128B is in the second-arm disengaged position, first-nozzle-separator-plate first-part engagement surface 115A and second-nozzle-separator-plate first-part engagement surface 115B are non-coplanar. When first arm 128A is in the first-arm engaged position, and second arm 128B is in the second-arm engaged position, first-nozzle-separator-plate first-part engagement surface 115A and second-nozzle-separator-plate first-part engagement surface 115B are coplanar.

First-nozzle-separator-plate first-part engagement surface 115A and second-nozzle-separator-plate first-part engagement surface 115B, being non-coplanar when first arm 128A is in the first-arm disengaged position and second arm 128B is in the second-arm disengaged position, helps to reduce an overall footprint (e.g., width) of end effector 100, which enables end effector 100 to reach and occupy tight spaces as needed. First-nozzle-separator-plate first-part engagement surface 115A and second-nozzle-separator-plate first-part engagement surface 115B, being coplanar when first arm 128A is in the first-arm engaged position and second arm 128B is in the second-arm engaged position, enables first-nozzle-separator-plate first-part engagement surface 115A and second-nozzle-separator-plate first-part engagement surface 115B to be flush against first part 122 when first arm 128A is in the first-arm engaged position and second arm 128B is in the second-arm engaged position.

Referring generally to FIG. 1 and particularly to, e.g., FIGS. 4-6 and 12-15 for illustrative purposes only and not by way of limitation, the following portion of this paragraph delineates example 18 of the subject matter, disclosed herein. According to example 18, which encompasses any one of examples 3 to 17 above, when first arm 128A is in the first-arm engaged position, and second arm 128B is in the second-arm engaged position, a minimum distance between first-nozzle separator plate 114A and second-nozzle separator plate 114B is less than a minimum distance between first-nozzle-body outlet port 116A and second-nozzle-body inlet port 116B.

The minimum distance between first-nozzle separator plate 114A and second-nozzle separator plate 114B, being less than the minimum distance between first-nozzle-body outlet port 116A and second-nozzle-body outlet port 118B, enables first-nozzle separator plate 114A and second-nozzle separator plate 114B to be positioned between first part 122 and second part 124 when first-nozzle-body outlet port 116A and second-nozzle-body outlet port 118B are in position to dispense adhesive 102 between first part 122 and second part 124, which promotes separation of second part 124 from first part 122 by first-nozzle separator plate 114A and second-nozzle separator plate 114B before adhesive 102 is dispensed.

Referring generally to FIG. 1 and particularly to, e.g., FIGS. 2A-6 and 12-15 for illustrative purposes only and not by way of limitation, the following portion of this paragraph delineates example 19 of the subject matter, disclosed herein. According to example 19, which encompasses any one of examples 3 to 18, above, end effector 100 further comprises first linear slide 144A, which couples first nozzle 112A to first arm 128A such that first nozzle 112A is movable relative to first arm 128A. End effector 100 additionally comprises second linear slide 144B, which couples second nozzle 112B to second arm 128B such that second nozzle 112B is movable relative to second arm 128B.

First linear slide 144A enables and ensures only linear movement of first nozzle 112A, relative to first arm 128A, and second linear slide 144B, enables and ensures only linear movement of second nozzle 112B, relative to second arm 128B. Each one of first linear slide 144A and second linear slide 144B is a component, such as linear-motion bearings, that provides for smooth and low-friction motion along a single axis. In some examples, end effector 100 additionally includes a first gimbal, coupled to first arm 128A and to which first linear slide 144A is coupled, and a second gimbal, coupled to second arm 128B and to which second linear slide 144B is coupled. First gimbal and second gimbal facilitate movement of first linear slide 144A and second linear slide 144B, respectively, about multiple axes, which helps to orient first nozzle 112A and second nozzle 112B relative to first part 122 as first arm 128A and second arm 128B are moved into the first-arm engaged position and the second-arm engaged position, respectively.

Referring generally to FIG. 1 and particularly to, e.g., FIGS. 2A-6 and 12-15 for illustrative purposes only and not by way of limitation, the following portion of this paragraph delineates example 20 of the subject matter, disclosed herein. According to example 20, which encompasses any one of examples 3 to 19, above, end effector 100 further comprises first actuator 150A, which is coupled to support 110 and to first arm 128A. First actuator 150A is selectively actuatable such that first arm 128A moves to one of the first-arm disengaged position or the first-arm engaged position. End effector 100 also comprises second actuator 150B, which is coupled to support 110 and second arm 128B. Second actuator 150B is selectively actuatable such that second arm 128B moves to one of the second-arm disengaged position or the second-arm engaged position.

First actuator 150A and second actuator 150B enable selective moving of first arm 128A and second arm 128B, respectively. In some examples, each one of first actuator 150A and second actuator 150B is a selectively controllable actuator powered by one or more of hydraulic power, electric power, electromagnetic power, pneumatic power, and the like.

Referring generally to FIG. 1 and particularly to, e.g., FIGS. 2A-15 for illustrative purposes only and not by way of limitation, the following portion of this paragraph delineates example 21 of the subject matter, disclosed herein. According to example 21, which encompasses any one of examples 1 to 11, above, first-nozzle-body outlet port 116A is open in a first direction. Second-nozzle-body inlet port 116B is open in a second direction. First-nozzle separator plate 114A extends from first-nozzle body 140A in the first direction. Second-nozzle separator plate 114B extends from second-nozzle body 140B in the second direction. First-nozzle separator plate 114A is offset from first-nozzle-body outlet port 116A along first-nozzle-body axis 119A that is perpendicular to first virtual ray 113A, which corresponds to the first direction. Second-nozzle separator plate 114B is offset from second-nozzle-body inlet port 116B along second-nozzle-body axis 119B that is perpendicular to second virtual ray 113B, which corresponds to the second direction.

First-nozzle separator plate 114A, being offset from first-nozzle-body outlet port 116A along first-nozzle-body axis 119A, enables first-nozzle-body outlet port 116A to trail first-nozzle separator plate 114A as end effector 100 moves relative to first part 122 and second part 124 (e.g., in the direction, indicated by a directional arrow in FIGS. 7-11), and as adhesive 102 is dispensed from first-nozzle-body outlet port 116A between first part 122 and second part 124. Similarly, second-nozzle separator plate 114B, being offset from second-nozzle-body outlet port 118B along second-nozzle-body axis 119B, enables second-nozzle-body inlet port 116B to trail second-nozzle separator plate 114B as end effector 100 moves relative to first part 122 and second part 124 (e.g., in the direction, indicated by a directional arrow in FIGS. 7-11), and as portions of adhesive 102 is received from between first part 122 and second part 124 into second-nozzle-body inlet port 116B.

Figure 12:
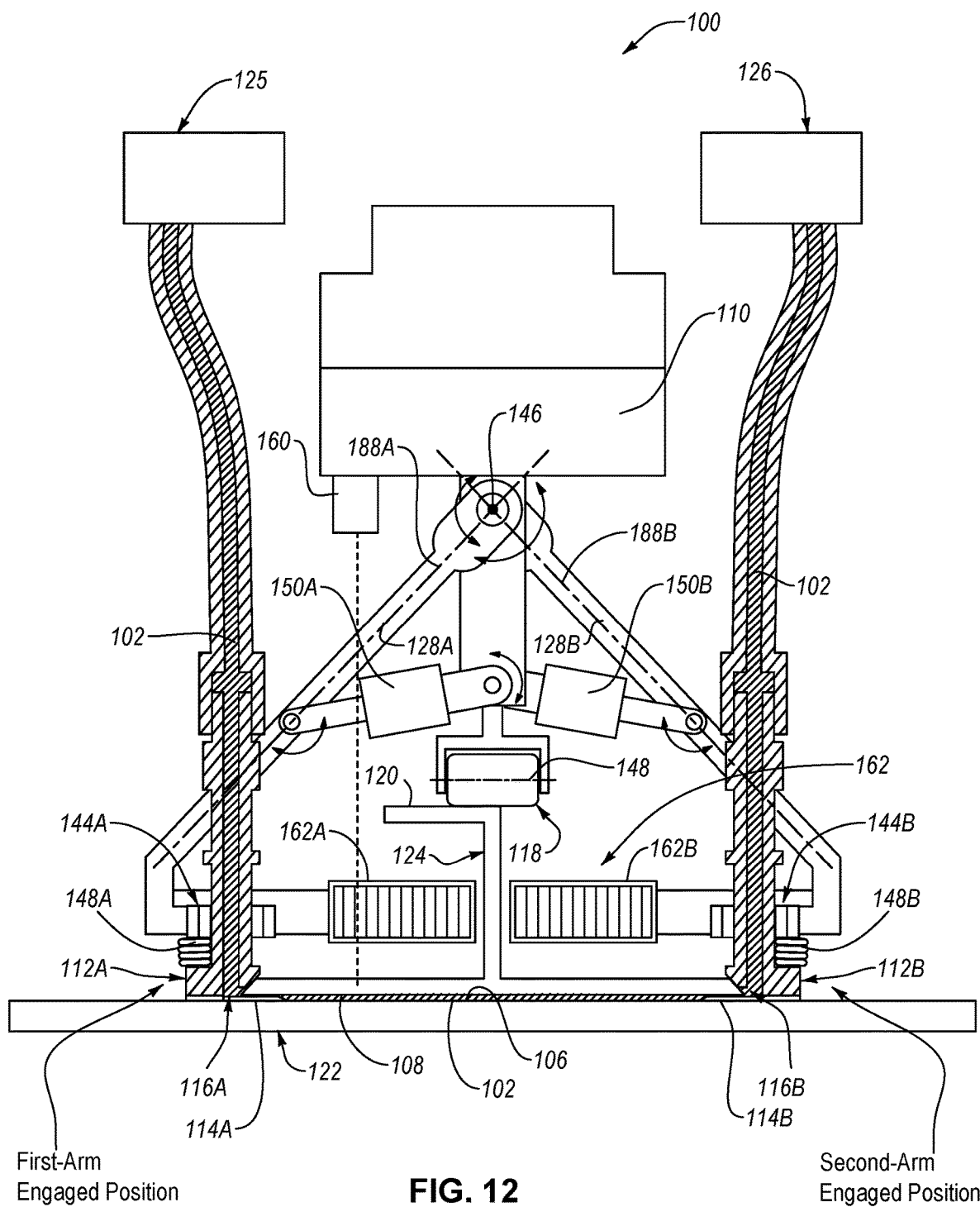
FIG. 12 is a schematic, elevation, sectional view of the end effector of FIG. 1, according to one or more examples of the subject matter, disclosed herein.

Referring generally to FIG. 1 and particularly to, e.g., FIG. 12 for illustrative purposes only and not by way of limitation, the following portion of this paragraph delineates example 22 of the subject matter, disclosed herein. According to example 22, which encompasses example 1 or 2, above, end effector 100 further comprises first arm 128A, which couples first nozzle 112A to support 110. End effector 100 also comprises second arm 128B, which couples second nozzle 112B to support 110. End effector 100 additionally comprises sensor 162, which is coupled directly or magnetically to first arm 128A and to second arm 128B. First arm 128A is movable, relative to support 110, such that first arm 128A is selectively movable to one of a first-arm disengaged position or a first-arm engaged position. Second arm 128B is movable, relative to support 110, such that second arm 128B is selectively movable to one of a second-arm disengaged position or a second-arm engaged position. First-nozzle separator plate 114A is closer to second-nozzle separator plate 114B when first arm 128A is in the first-arm engaged position, and second arm 128B is in the second-arm engaged position, than when first arm 128A is in the first-arm disengaged position, and second arm 128B is in the second-arm disengaged position.

Sensor 162 provides for detection of adhesive 102 between first part 122 and second part 124. Detection of adhesive between first part 122 and second part 124 by sensor 162 enables adjustments to the operation of end effector 100 that promote the speed and efficiency at which adhesive 102 is delivered into space 104 between first part 122 and second part 124 and the distribution uniformity of adhesive 102 delivered into space 104. Sensor 162 is configured to detect presence of adhesive 102 between first part 122 and second part 124. In some examples, sensor 162 is one or more of an ultrasonic sensor array, an optical sensor, a pressure sensor, an infrared sensor, a motion sensor, and the like. In some examples, sensor 162 is coupled directly to first arm 128A and to second arm 128B, such that sensor 162 co-moves with first arm 128A and second arm 128B. In yet some examples, sensor 162 is coupled magnetically to first arm 128A and to second arm 128B, such that sensor 162 can be magnetically coupled to first arm 128A and to second arm 128B before or after first arm 128A and second arm 128B is moved into first-arm engaged position and second-arm engaged position, respectively.

Referring generally to FIG. 1 and particularly to, e.g., FIG. 12 for illustrative purposes only and not by way of limitation, the following portion of this paragraph delineates example 23 of the subject matter, disclosed herein. According to example 23, which encompasses example 22, above, sensor 162 comprises first sensor 162A, which is coupled directly or magnetically to first arm 128A. Sensor 162 also comprises second sensor 162B, which is coupled directly or magnetically to second arm 128B.

First sensor 162A, being coupled directly or magnetically to first arm 128A, and second sensor 162B, being coupled directly or magnetically to second arm 128B, promotes ease and efficiency for detecting presence of adhesive 102 between first part 122 and second part 124. Additionally, first sensor 162A and second sensor 162B enable relative movement of first sensor 162A and second sensor 162B as first arm 128A and second arm 128B move relative to each other.

Figure 13:
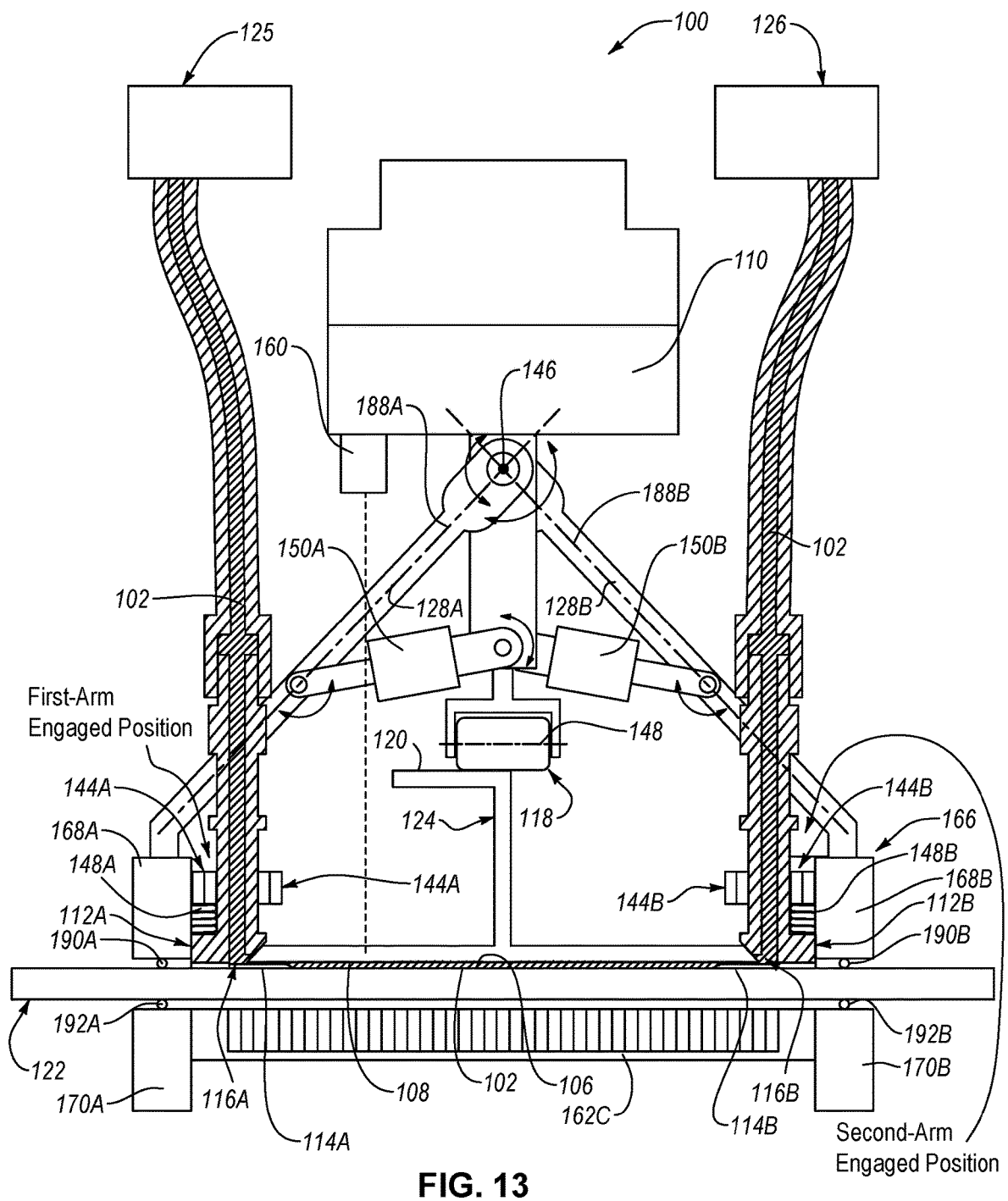
FIG. 13 is a schematic, elevation, sectional view of the end effector of FIG. 1, according to one or more examples of the subject matter, disclosed herein.

Referring generally to FIG. 1 and particularly to, e.g., FIG. 13 for illustrative purposes only and not by way of limitation, the following portion of this paragraph delineates example 24 of the subject matter, disclosed herein. According to example 24, which encompasses example 1 or 2, above, end effector 100 further comprises first arm 128A, which couples first nozzle 112A to support 110. End effector 100 also comprises second arm 128B, which couples second nozzle 112B to support 110. End effector 100 additionally comprises magnetic coupling assembly 166, which comprises first magnetic coupler 168A, attached to first arm 128A, second magnetic coupler 168B, attached to second arm 128B, third magnetic coupler 170A, magnetically coupleable to first magnetic coupler 168A, and fourth magnetic coupler 170B, magnetically coupleable to second magnetic coupler 168B. End effector 100 further comprises sensor 162C, which is attached to at least one of third magnetic coupler 170A and fourth magnetic coupler 170B. First arm 128A is movable, relative to support 110, such that first arm 128A is selectively movable to one of a first-arm disengaged position or a first-arm engaged position. Second arm 128B is movable, relative to support 110, such that second arm 128B is selectively movable to one of a second-arm disengaged position or a second-arm engaged position. First-nozzle separator plate 114A is closer to second-nozzle separator plate 114B when first arm 128A is in the first-arm engaged position, and second arm 128B is in second-arm engaged position, than when first arm 128A is in the first-arm disengaged position, and second arm 128B is in the second-arm disengaged position.

Magnetic coupling assembly 166 enables presence of adhesive between first part 122 and second part 124 to be detected by sensor 162C from the side of first part 122 that is opposite the side the second part 124 is on. Such a configuration is helpful when access to first part 122 and second part 124 is difficult from the side of first part 122 that second part 124 is on.

Figure 15:
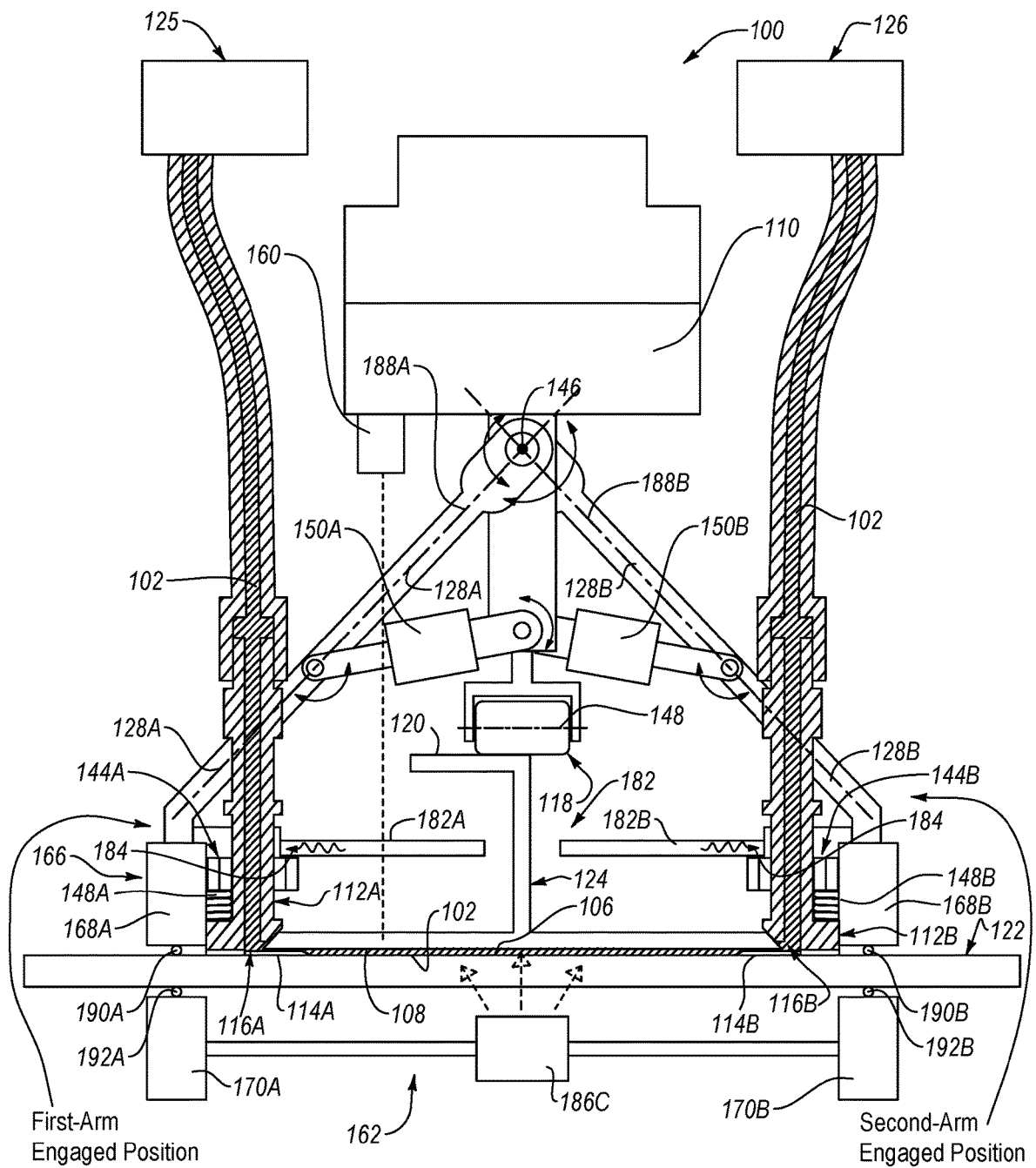
FIG. 15 is a schematic, elevation, sectional view of the end effector of FIG. 1, according to one or more examples of the subject matter, disclosed herein.

Referring generally to FIG. 1 and particularly to, e.g., FIGS. 13 and 15 for illustrative purposes only and not by way of limitation, the following portion of this paragraph delineates example 25 of the subject matter, disclosed herein. According to example 25, which encompasses example 24, above, first magnetic coupler 168A comprises first-magnetic-coupler roller 190A. Second magnetic coupler 168B comprises second-magnetic-coupler roller 190B. Third magnetic coupler 170A comprises third-magnetic-coupler roller 192A. Fourth magnetic coupler 170B comprises fourth-magnetic-coupler roller 192B. First magnetic coupler 168A and third magnetic coupler 170A are configured to be positioned such that first-magnetic-coupler roller 190A and third-magnetic-coupler roller 192A face each other. Second magnetic coupler 168B and fourth magnetic coupler 170B are configured to be positioned such that second-magnetic-coupler roller 190B and fourth-magnetic-coupler roller 192B face each other.

First-magnetic-coupler roller 190A, second-magnetic-coupler roller 190B, third-magnetic-coupler roller 192A, and fourth-magnetic-coupler roller 192B enable low-friction, translational movement of first magnetic coupler 168A, second magnetic coupler 168B, third magnetic coupler 170A, and fourth magnetic coupler 170B on opposing surfaces of first part 122 when end effector 100 translationally moves along first part 122 and second part 124.

Figure 14:
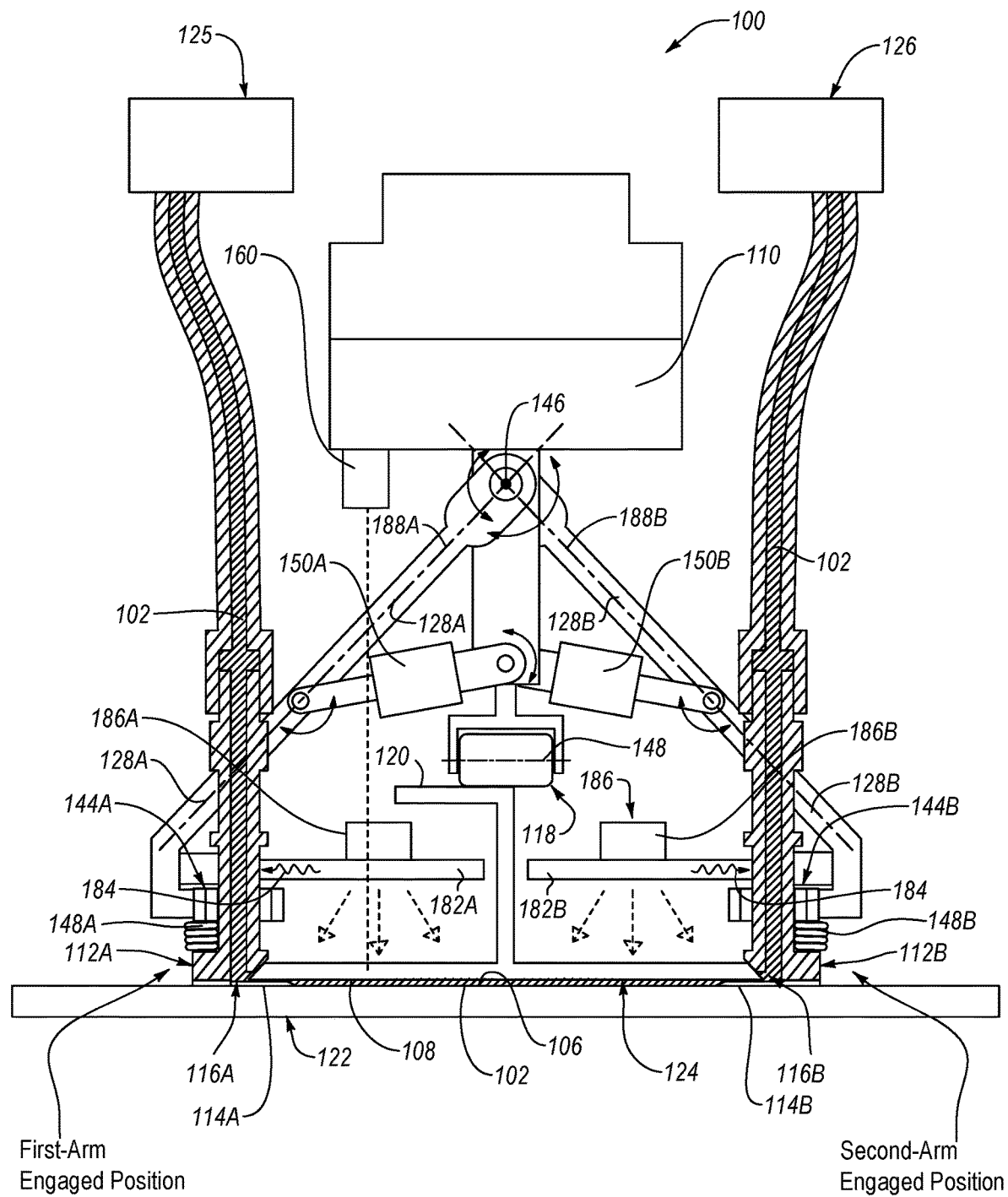
FIG. 14 is a schematic, elevation, sectional view of the end effector of FIG. 1, according to one or more examples of the subject matter, disclosed herein.

Referring generally to FIG. 1 and particularly to, e.g., FIG. 14 for illustrative purposes only and not by way of limitation, the following portion of this paragraph delineates example 26 of the subject matter, disclosed herein. According to example 26, which encompasses example 1 or 2, above, end effector 100 further comprises first arm 128A, which couples first nozzle 112A to support 110. End effector 100 also comprises second arm 128B, which couples second nozzle 112B to support 110. End effector 100 additionally comprises heat source 182, which is coupled to at least one of first arm 128A or second arm 128B and configured to generate heat 184. End effector 100 further comprises infrared camera 186, which is coupled to at least one of first arm 128A or second arm 128B and configured to generate images. First arm 128A is movable, relative to support 110, such that first arm 128A is selectively movable to one of a first-arm disengaged position or a first-arm engaged position. Second arm 128B is movable, relative to support 110, such that second arm 128B is selectively movable to one of a second-arm disengaged position or a second-arm engaged position. First-nozzle separator plate 114A is closer to second-nozzle separator plate 114B when first arm 128A is in the first-arm engaged position, and second arm 128B is in the second-arm engaged position, than when first arm 128A is in the first-arm disengaged position, and second arm 128B is in the second-arm disengaged position.

Heat source 182 provides heat for heating adhesive 102 just prior to being delivered from first-nozzle-body outlet port 116A into space 104 between first part 122 and second part 124, and after adhesive 102 is received into second-nozzle-body inlet port 116B. Heating adhesive 102 increases the temperature of adhesive 102, which improves flowability of adhesive 102 through space 104 between first part 122 and second part 124. Infrared camera 186 enables detection of presence of adhesive 102. Heating of adhesive 102 promotes a higher thermal energy contrast between space 104 with adhesive 102 and without adhesive 102, which improves the accuracy of detection of the presence of adhesive 102 by infrared camera 186.

Referring generally to FIG. 1 and particularly to, e.g., FIG. 14 for illustrative purposes only and not by way of limitation, the following portion of this paragraph delineates example 27 of the subject matter, disclosed herein. According to example 27, which encompasses example 26, above, heat source 182 comprises first heat source 182A, which is coupled directly or magnetically to first arm 128A. Heat source 182 additionally comprises second heat source 182B, which is coupled directly or magnetically to second arm 128B. Infrared camera 186 comprises first infrared camera 186A, which is coupled directly or magnetically to first arm 128A. Infrared camera 186 also comprises second infrared camera 186B, which is coupled directly or magnetically to second arm 128B.

First heat source 182A, being coupled directly or magnetically to first arm 128A, and second heat source 182B, being coupled directly or magnetically to second arm 128B, promotes ease and efficiency for heating adhesive 102 before and after flowing between first part 122 and second part 124. First infrared camera 186A, being coupled directly or magnetically to first arm 128A, and second infrared camera 186B, being coupled directly or magnetically to second arm 128B, promotes ease and efficiency for detecting presence of adhesive 102 between first part 122 and second part 124. Additionally, first heat source 182A, second heat source 182B, first infrared camera 186A, and second infrared camera 186B enable relative movement of first heat source 182A and second heat source 182B, and first infrared camera 186A and second infrared camera 186B, as first arm 128A and second arm 128B move relative to each other.

Referring generally to FIG. 1 and particularly to, e.g., FIG. 15 for illustrative purposes only and not by way of limitation, the following portion of this paragraph delineates example 28 of the subject matter, disclosed herein. According to example 28, which encompasses example 1 or 2, above, end effector 100 further comprises first arm 128A, which couples first nozzle 112A to support 110. End effector 100 also comprises second arm 128B, which couples second nozzle 112B to support 110. End effector 100 additionally comprises magnetic coupling assembly 166, which comprises first magnetic coupler 168A, attached to first arm 128A, second magnetic coupler 168B, attached to second arm 128B, third magnetic coupler 170A, magnetically coupleable to first magnetic coupler 168A, and fourth magnetic coupler 170B, magnetically coupleable to second magnetic coupler 168B. End effector 100 further comprises heat source 182, which is coupled to at least one of first arm 128A and second arm 128B. Heat source 182 is configured to generate heat 184. End effector 100 also comprises infrared camera 186C, which is attached to at least one of third magnetic coupler 170A and fourth magnetic coupler 170B. Infrared camera 186C is configured to generate images. First arm 128A is movable, relative to support 110, such that first arm 128A is selectively movable to one of a first-arm disengaged position or a first-arm engaged position. Second arm 128B is movable, relative to support 110, such that second arm 128B is selectively movable to one of a second-arm disengaged position or a second-arm engaged position. First-nozzle separator plate 114A is closer to second-nozzle separator plate 114B when first arm 128A is in the first-arm engaged position and second arm 128B is in the second-arm engaged position than when first arm 128A is in the first-arm disengaged position and second arm 128B is in the second-arm disengaged position.

Magnetic coupling assembly 166 enables presence of adhesive between first part 122 and second part 124 to be detected by infrared camera 186C from the side of first part 122 that is opposite the side of second part 124 is on. Such a configuration is helpful when access to first part 122 and second part 124 is difficult from the side of first part 122 that second part 124 is on.

Referring generally to FIG. 1 and particularly to, e.g., FIG. 15 for illustrative purposes only and not by way of limitation, the following portion of this paragraph delineates example 29 of the subject matter, disclosed herein. According to example 29, which encompasses example 28, above, first magnetic coupler 168A comprises first-magnetic-coupler roller 190A. Second magnetic coupler 168B comprises second-magnetic-coupler roller 190B. Third magnetic coupler 170A comprises third-magnetic-coupler roller 192A. Fourth magnetic coupler 170B comprises fourth-magnetic-coupler roller 192B. First magnetic coupler 168A and third magnetic coupler 170A are configured to be positioned such that first-magnetic-coupler roller 190A and third-magnetic-coupler roller 192A face each other. Second magnetic coupler 168B and fourth magnetic coupler 170B are configured to be positioned such that second-magnetic-coupler roller 190B and fourth-magnetic-coupler roller 192B face each other.

First-magnetic-coupler roller 190A, second-magnetic-coupler roller 190B, third-magnetic-coupler roller 192A, and fourth-magnetic-coupler roller 192B enable low-friction, translational movement of first magnetic coupler 168A, second magnetic coupler 168B, third magnetic coupler 170A, and fourth magnetic coupler 170B on opposing surfaces of first part 122 when end effector 100 translationally moves along first part 122 and second part 124.

Referring generally to FIG. 1 and particularly to, e.g., FIGS. 2A-6 and 12-15 for illustrative purposes only and not by way of limitation, the following portion of this paragraph delineates example 30 of the subject matter, disclosed herein. According to example 30, which encompasses any one of examples 1 to 29, above, end effector 100 further comprises proximity sensor 160, which is coupled to support 110.

Proximity sensor 160 provides for the determination of the distance of end effector 100 from one or both of first part 122 and second part 124, which helps end effector 100 to be moved into a proper position, relative to first part 122 and second part 124, for dispensing adhesive 102 between first part 122 and second part 124, and to avoid damaging first part 122 or second part 124, inadvertently impacting first part 122 or second part 124 with end effector 100, as end effector 100 is moved toward first part 122 and second part 124 in preparation for an adhesive-dispensing operation.

Proximity sensor 160 is any of various sensors configured to detect the presence of nearby objects without any physical contact. Generally, proximity sensor 160 emits an electromagnetic field or beam and detects changes in the field or return signal. One example of proximity sensor 160 is a 932 Series proximity sensor, made by Honeywell International, Inc.

Referring generally to FIGS. 16A and 16B and particularly to, e.g., FIGS. 2A-15 for illustrative purposes only and not by way of limitation, the following portion of this paragraph delineates example 31 of the subject matter, disclosed herein. According to example 31, disclosed herein is method 200 of using end effector 100 of example 1 for adhesively attaching first part 122, which comprises first-part faying surface 106, to second part 124, which comprises second-part faying surface 108. Method 200 comprises (block 202) moving first nozzle 112A relative to support 110 such that first-nozzle separator plate 114A is inserted between and separates first-part faying surface 106 and second-part faying surface 108. Method 200 also comprises (block 204) moving second nozzle 112B relative to support 110 such that second-nozzle separator plate 114B is inserted between and separates first-part faying surface 106 and second-part faying surface 108. Method 200 further comprises (block 206), with first-nozzle separator plate 114A inserted between and separating first-part faying surface 106 and second-part faying surface 108, dispensing volume of adhesive 102 into space 104, defined between first-part faying surface 106 and second-part faying surface 108, in a flow direction from first-nozzle-body outlet port 116A to second-nozzle-body inlet port 116B. Method 200 additionally comprises (block 208), with second-nozzle separator plate 114B inserted between and separating first-part faying surface 106 and second-part faying surface 108, receiving a portion of volume of adhesive 102 into second-nozzle-body inlet port 116B.

Method 200 facilitates depositing adhesive 102 through first-nozzle-body outlet port 116A into space 104 between first part 122 and second part 124. Inserting first-nozzle separator plate 114A between first-part faying surface 106 and second-part faying surface 108 acts as a wedge to facilitate separation between first part 122 and second part 124 to create space 104. Similarly, inserting second-nozzle separator plate 114B between first-part faying surface 106 and second-part faying surface 108 promotes separation between first part 122 and second part 124 to create space 104. First-nozzle-body outlet port 116A and first-nozzle separator plate 114A enable adhesive 102 to be deposited, through first-nozzle-body outlet port 116A, into space 104 when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as adhesive 102 is deposited, through first-nozzle-body outlet port 116A, between first part 122 and second part 124. In contrast, second-nozzle-body inlet port 116B and second-nozzle separator plate 114B enable a portion of adhesive 102 in space 104 to be received into second-nozzle-body inlet port 116B when second-nozzle separator plate 114B is located between and is separating first part 122 and second part 124. Accordingly, a configuration of second-nozzle-body inlet port 116B and second-nozzle separator plate 114B maintains separation between first part 122 and second part 124 as adhesive 102 is received into second-nozzle-body inlet port 116B.

In some examples, second part 124 is a J-stringer or I-stringer. Accordingly, second part 124 includes elongated flanges (e.g., elongated into the page, as shown in FIGS. 2A-6 and 12-15) and an elongated J-portion (e.g., elongated into the page, as shown in FIGS. 2A-6) interposed between the elongated flanges. One of the elongated flanges, at first side 123 of second part 124, defines a first-side portion of second-part faying surface 108. The other one of the elongated flanges, at second side 131 of second part 124, defines a second-side portion of second-part faying surface 108. Second-part faying surface 108 is designed to be adhesively bonded to first-part faying surface 106.

Referring generally to FIGS. 16A and 16B and particularly to, e.g., FIGS. 2A-15 for illustrative purposes only and not by way of limitation, the following portion of this paragraph delineates example 32 of the subject matter, disclosed herein. According to example 32, which encompasses example 31, above, (block 210) receiving the portion of volume of adhesive 102 into second-nozzle-body inlet port 116B comprises (block 210) generating a vacuum in second-nozzle-body inlet port 116B.

Generating the vacuum in second-nozzle-body inlet port 116B promotes a suction force at the second-nozzle-body inlet port 116B, which draws adhesive 102 into second-nozzle-body inlet port 116B from space 104 between first part 122 and second part 124.

Referring generally to FIGS. 16A and 16B and particularly to, e.g., FIGS. 2A-15 for illustrative purposes only and not by way of limitation, the following portion of this paragraph delineates example 33 of the subject matter, disclosed herein. According to example 33, which encompasses examples 31 or 32, above, method 200 further comprises (block 212) translationally moving end effector 100 relative to first part 122 and second part 124, perpendicular to roller axis 148, simultaneously with (block 206) dispensing volume of adhesive 102 into space 104 in the flow direction and (block 208) receiving the portion of volume of adhesive 102 into second-nozzle-body inlet port 116B.

Translationally moving end effector 100 relative to first part 122 and second part 124, perpendicular to roller axis 148, simultaneously with dispensing the volume of adhesive 102 into space 104 in flow direction and receiving the portion of the volume of adhesive into second-nozzle-body inlet port 116B enables continuous, uniform, and controlled deposition of adhesive 102 between first part 122 and second part 124 along a dimension (e.g., length) of first part 122 and second part 124. End effector 100 is moved along translational-movement axis 127, which is perpendicular to roller axis 148.

Figure 9:
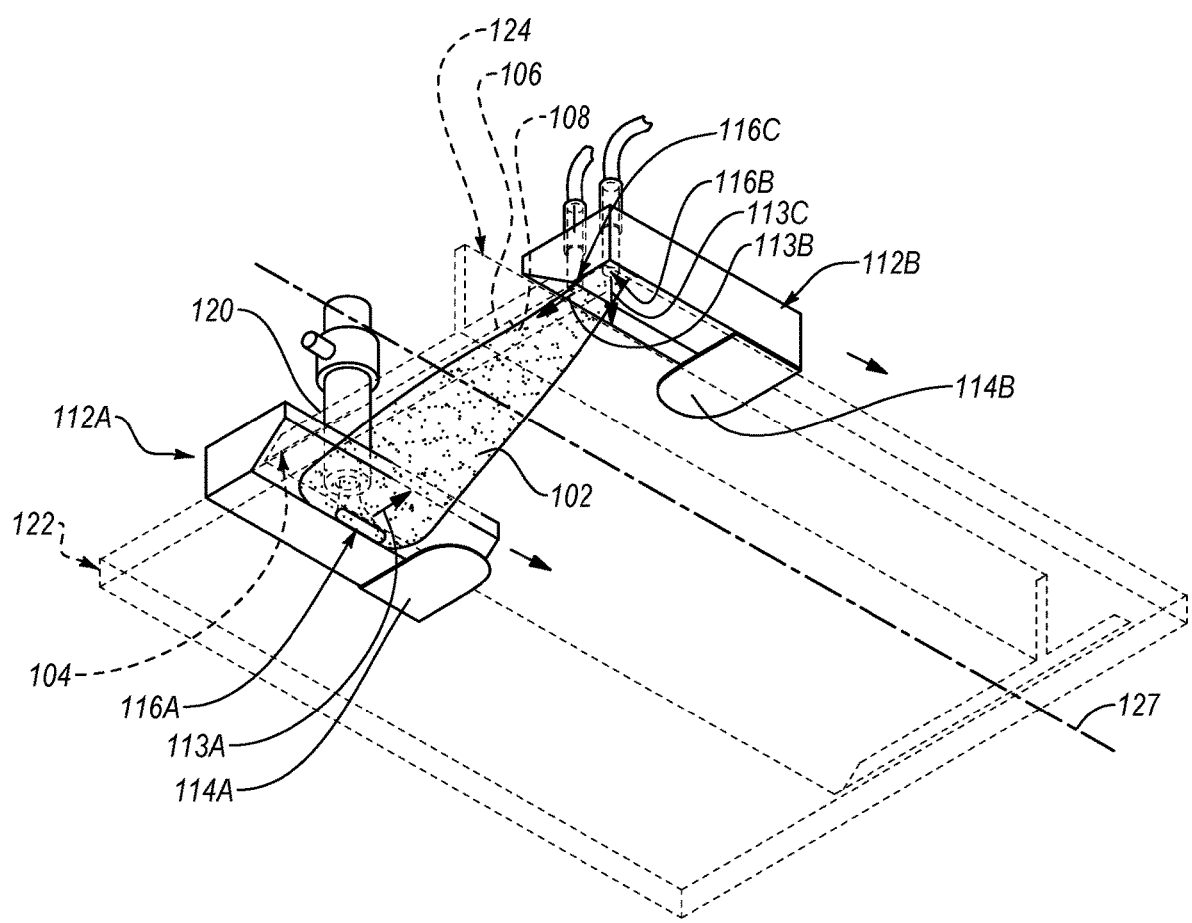
FIG. 9 is a schematic, perspective view of a first nozzle and a second nozzle of the apparatus of FIG. 1, according to one or more examples of the subject matter, disclosed herein.
Figure 10:
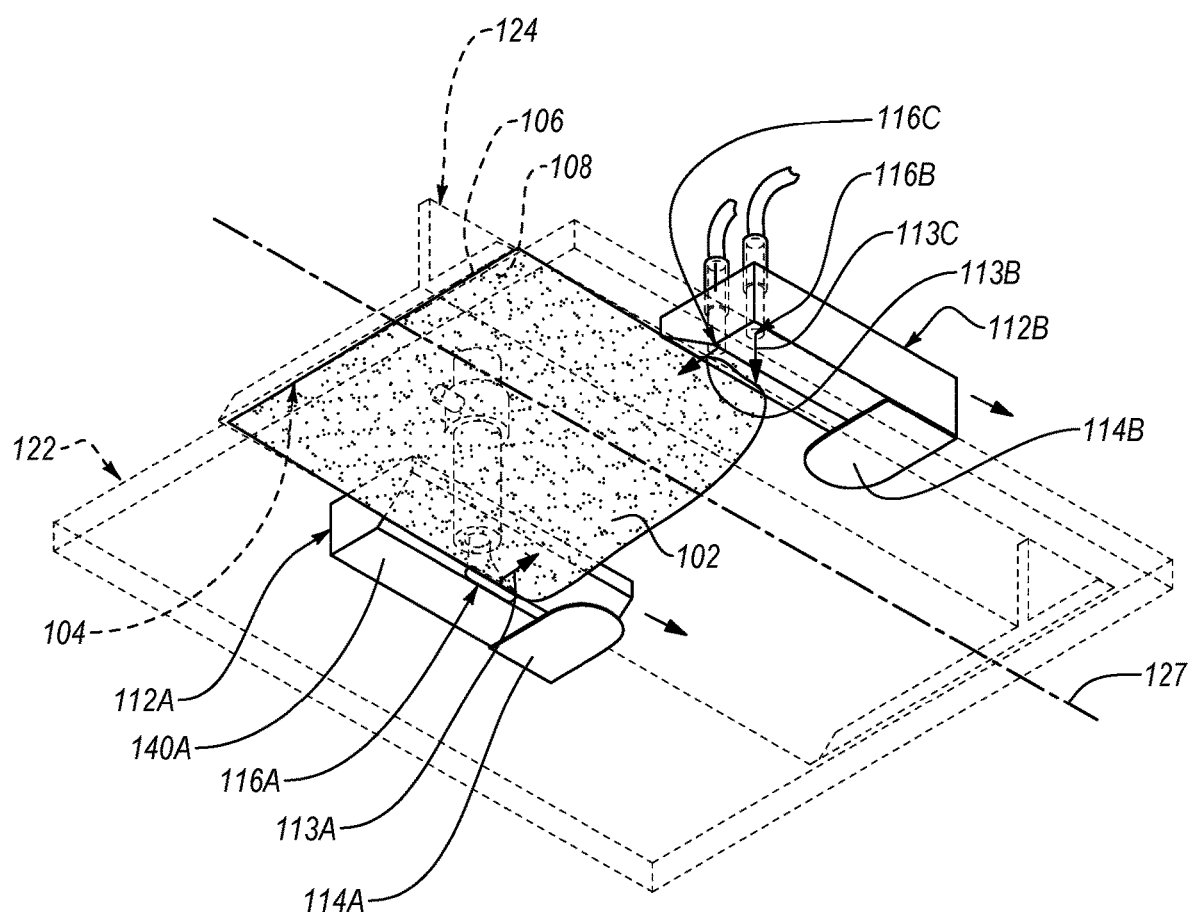
FIG. 10 is a schematic, perspective view of a first nozzle and a second nozzle of the apparatus of FIG. 1, according to one or more examples of the subject matter, disclosed herein.
Figure 11:
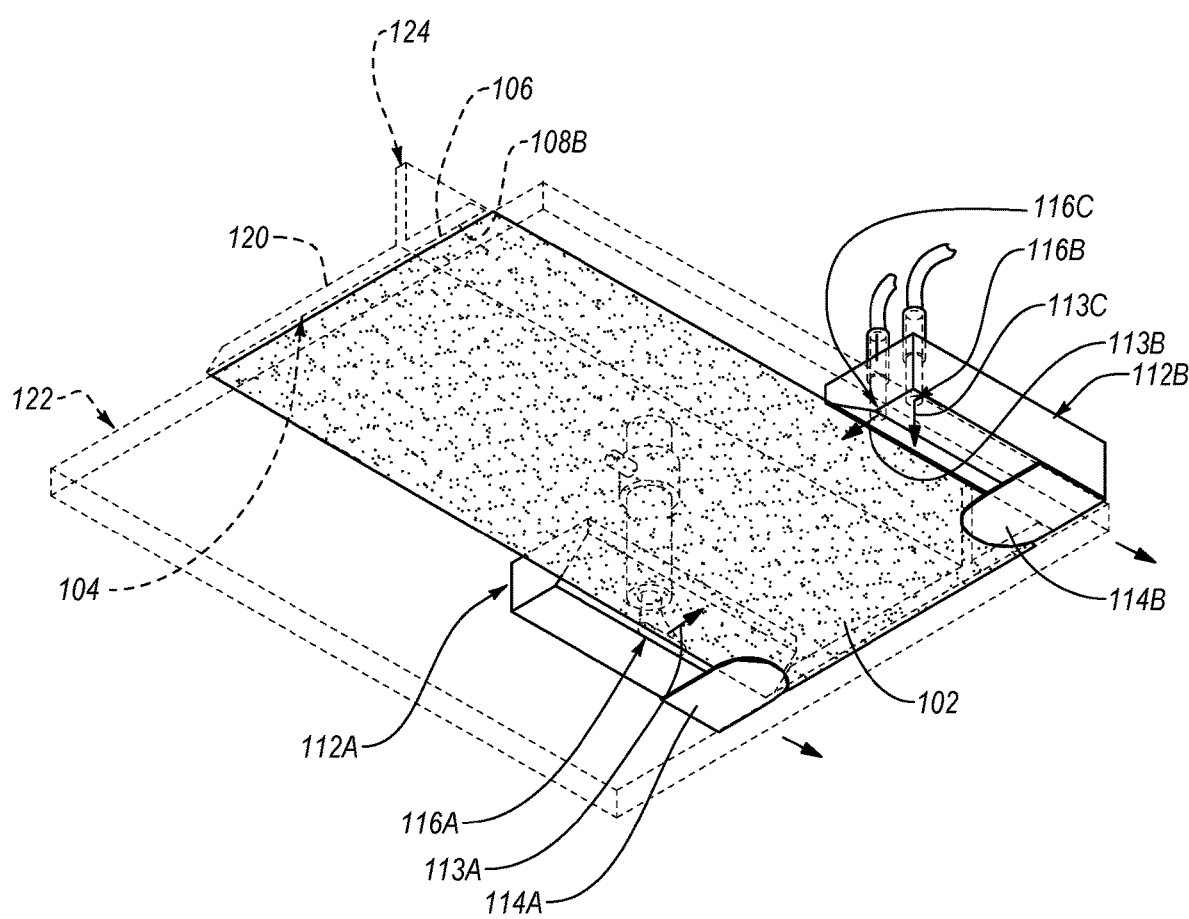
FIG. 11 is a schematic, perspective view of a first nozzle and a second nozzle of the apparatus of FIG. 1, according to one or more examples of the subject matter, disclosed herein.

Referring to FIGS. 9-11, illustrated is a progression of adhesive 102 being dispensed between first part 122 and second part 124, and adhesive 102 being received from between first part 122 and second part 124, as end effector 100, and thus first nozzle 112A and second nozzle 112B, is translationally moved relative to first part 122 and second part 124.

Referring generally to FIGS. 16A and 16B and particularly to, e.g., FIGS. 2A-15 for illustrative purposes only and not by way of limitation, the following portion of this paragraph delineates example 34 of the subject matter, disclosed herein. According to example 34, which encompasses example 33, above, method 200 further comprises (block 214), simultaneously with (block 212) translationally moving end effector 100 relative to first part 122 and second part 124, rolling roller 118 along outer surface 120 of second part 124.

Rolling roller 118 along outer surface 120 of second part 124, simultaneously with translationally moving end effector 100 relative to first part 122 and second part 124, helps prevent movement of second part 124 away from first part 122 beyond a predetermined distance when adhesive 102 is being dispensed between first part 122 and second part 124 along a length of first part 122 and second part 124.

Referring generally to FIGS. 16A and 16B and particularly to, e.g., FIGS. 2A-15 for illustrative purposes only and not by way of limitation, the following portion of this paragraph delineates example 35 of the subject matter, disclosed herein. According to example 35, which encompasses example 34, above, method 200 further comprises (block 216), simultaneously with (block 206) dispensing volume of adhesive 102 into space 104 in the flow direction and (block 208) receiving the portion of volume of adhesive 102 into second-nozzle-body inlet port 116B, biasing first-nozzle separator plate 114A against first part 122. Method 200 also comprises (block 218), simultaneously with (block 206) dispensing volume of adhesive 102 into space 104 in the flow direction and (block 208) receiving the portion of volume of adhesive 102 into second-nozzle-body inlet port 116B, biasing second-nozzle separator plate 114B against first part 122.

Biasing first-nozzle separator plate 114A against first part 122 and biasing second-nozzle separator plate 114B against first part 122, simultaneously with dispensing the volume of adhesive 102 and receiving the portion of the volume of adhesive 102, helps keep first-nozzle-body outlet port 116A and second-nozzle-body inlet port 116B in proper position relative to first part 122 to dispense adhesive 102 between first part 122 and second part 124 and receive adhesive 102 from between first part 122 and second part 124, respectively.

Referring generally to FIGS. 16A and 16B and particularly to, e.g., FIGS. 2A-15 for illustrative purposes only and not by way of limitation, the following portion of this paragraph delineates example 36 of the subject matter, disclosed herein. According to example 36, which encompasses any one of examples 33 to 35, above, method 200 further comprises (block 220) detecting presence of volume of adhesive 102 between first-part faying surface 106 and second-part faying surface 108.

Detecting the presence of the volume of adhesive 102 between first-part faying surface 106 and second-part faying surface 108 promotes a uniform distribution and coverage of adhesive 102 between first-part faying surface 106 and second-part faying surface 108.

Referring generally to FIGS. 16A and 16B and particularly to, e.g., FIGS. 2A-15 for illustrative purposes only and not by way of limitation, the following portion of this paragraph delineates example 37 of the subject matter, disclosed herein. According to example 37, which encompasses example 36, above, method 200 further comprises, in response to (block 220) detecting the presence of volume of adhesive 102 between first-part faying surface 106 and second-part faying surface 108, (block 222) adjusting at least one of a rate, at which volume of adhesive 102 is dispensed from first-nozzle-body outlet port 116A, a rate, at which end effector 100 translationally moves relative to first part 122 and second part 124, or a rate, at which the portion of volume of adhesive 102 is received into second-nozzle-body inlet port 116B.

Adjusting at least one of a rate, at which adhesive 102 is dispensed from first-nozzle-body outlet port 116A, a rate, at which end effector 100 translationally moves relative to first part 122 and second part 124, or a rate, at which the portion of the volume of adhesive 102 is received into second-nozzle-body inlet port 116B, in response to detecting the presence of the volume of adhesive 102 enables controlling the uniformity and coverage of the volume of adhesive 102 between first part 122 and second part 124.

Different examples of the apparatus(es) and method(s), disclosed herein, include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated, and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An end effector for adhesively attaching a first part to a second part, the end effector comprising:
   a support;
   a first nozzle, coupled to the support and movable relative to the support, wherein the first nozzle comprises:
   a first-nozzle body, comprising a first-nozzle-body outlet port; and a first-nozzle separator plate, extending from the first-nozzle body;
a second nozzle, coupled to the support and movable relative to the support, wherein the second nozzle comprises:
a second-nozzle body, comprising a second-nozzle-body inlet port; and
a second-nozzle separator plate, extending from the second-nozzle body; and
a roller, coupled to the support, rotatable relative to the support about a roller axis, and located between the first nozzle and the second nozzle.

2. The end effector according to claim 1, further comprising:
a first-nozzle biasing member, configured to bias the first nozzle away from the support; and
a second-nozzle biasing member, configured to bias the second nozzle away from the support.

3. The end effector according to claim 1, further comprising:
a first arm, coupling the first nozzle to the support; and
a second arm, coupling the second nozzle to the support, wherein:
the first arm is movable, relative to the support, such that the first arm is selectively movable to one of a first-arm disengaged position or a first-arm engaged position;
the second arm is movable, relative to the support, such that the second arm is selectively movable to one of a second-arm disengaged position or a second-arm engaged position; and
the first-nozzle separator plate is closer to the second-nozzle separator plate when the first arm is in the first-arm engaged position, and the second arm is in the second-arm engaged position, than when the first arm is in the first-arm disengaged position, and the second arm is in the second-arm disengaged position.

4. The end effector according to claim 3, wherein:
the first arm has a first-arm central axis;
the first arm is pivotable, relative to the support, so that the first-arm central axis lies in a first virtual plane;
the second arm has a second-arm central axis; and
the second arm is pivotable, relative to the support, so that the second-arm central axis lies in a second virtual plane.

5. The end effector according to claim 4, further comprising an axis, perpendicular to the first virtual plane and to the second virtual plane, wherein the first arm and the second arm are pivotable, relative to the support, about the axis.

6. The end effector according to claim 4, further comprising an axis, perpendicular to the first virtual plane, and a second axis, perpendicular to the second virtual plane, wherein:
the first arm is pivotable, relative to the support, about the axis ;
the second arm is pivotable, relative to the support, about the second axis; and
the axis and the second axis are parallel to each other.

7. The end effector according to claim 4, wherein the first virtual plane and the second virtual plane are parallel to each other.

8. The end effector according to claim 4, wherein the first virtual plane and the second virtual plane are coincident with each other.

9. The end effector according to claim 4, wherein at least one of the first virtual plane and the second virtual plane is parallel to a virtual plane, containing the roller axis, or is coincident with the virtual plane, containing the roller axis.

10. The end effector according to claim 3, further comprising:
a first-nozzle biasing member, configured to bias the first nozzle away from the support; and
a second-nozzle biasing member, configured to bias the second nozzle away from the support.

11. The end effector according to claim 3, wherein:
the first-nozzle-body outlet port is open in a first direction;
the second-nozzle-body inlet port is open in one of a second direction or a third direction; and
when the first arm is in the first-arm engaged position, and when the second arm is in the second-arm engaged position, the first nozzle and the second nozzle are oriented relative to each other such that a first virtual ray, corresponding with the first direction, is directed toward and is co-planar with a second virtual ray, corresponding with the second direction, and is perpendicular with a third virtual ray, corresponding with the third direction.

12. The end effector according to claim 11, further comprising:
a reservoir, fluidically coupled with the first nozzle; and
a vacuum source, fluidically coupled with the second nozzle.

13. The end effector according to claim 11, wherein:
the second-nozzle body further comprises a second second-nozzle-body inlet port;
the second-nozzle-body inlet port is open in the second direction; and
the second second-nozzle-body inlet port is open in the third direction.

14. The end effector according to claim 13, wherein the second-nozzle-body inlet port is offset relative to the second second-nozzle-body inlet port in a fourth direction, corresponding with a fourth virtual ray (113D) that is parallel with the first virtual ray.

15. The end effector according to claim 14, wherein the second-nozzle-body inlet port is offset relative to the second second-nozzle-body inlet port in a fifth direction, corresponding with a fifth virtual ray that is perpendicular with the fourth virtual ray.

16. The end effector according to claim 3, wherein:
the first-nozzle separator plate comprises a first-nozzle-separator-plate first-part engagement surface and a first-nozzle-separator-plate second-part engagement surface;
the first-nozzle-separator-plate first-part engagement surface and the first-nozzle-separator-plate second-part engagement surface are parallel to each other;
the second-nozzle separator plate comprises a second-nozzle-separator-plate first-part engagement surface and a second-nozzle-separator-plate second-part engagement surface;
the second-nozzle-separator-plate first-part engagement surface and the second-nozzle-separator-plate second-part engagement surface are parallel to each other;
when the first arm is in the first-arm disengaged position, and the second arm is in the second-arm disengaged position, the first-nozzle-separator-plate first-part engagement surface and the second-nozzle-separator-plate first-part engagement surface are non-coplanar; and
when the first arm is in the first-arm engaged position, and the second arm is in the second-arm engaged position, the first-nozzle-separator-plate first-part engagement surface and the second-nozzle-separator-plate first-part engagement surface are coplanar.

17. The end effector according to claim 3, wherein, when the first arm is in the first-arm engaged position, and the second arm is in the second-arm engaged position, a minimum distance between the first-nozzle separator plate and the second-nozzle separator plate is less than a minimum distance between the first-nozzle-body outlet port and the second-nozzle-body inlet port.

18. The end effector according to claim 3, further comprising:
- a first linear slide, coupling the first nozzle to the first arm such that the first nozzle is movable relative to the first arm; and
- a second linear slide, coupling the second nozzle to the second arm such that the second nozzle is movable relative to the second arm.

19. The end effector according to claim 3, further comprising:
- a first actuator, coupled to the support and to the first arm, wherein the first actuator is selectively actuatable such that the first arm moves to one of the first-arm engaged position or the first-arm disengaged position; and
- a second actuator, coupled to the support and the second arm, wherein the second actuator is selectively actuatable such that the second arm moves to one of the second-arm engaged position or the second-arm disengaged position.

20. A method of using the end effector of claim 1 for adhesively attaching the first part, which comprises a first-part faying surface, to the second part, which comprises a second-part faying surface, the method comprising steps of:
- moving the first nozzle relative to the support such that the first-nozzle separator plate is inserted between and separates the first-part faying surface and the second-part faying surface;
- moving the second nozzle relative to the support such that the second-nozzle separator plate is inserted between and separates the first-part faying surface and the second-part faying surface;
- with the first-nozzle separator plate inserted between and separating the first-part faying surface and the second-part faying surface, dispensing a volume of adhesive into a space, defined between the first-part faying surface and the second-part faying surface, in a flow direction from the first-nozzle-body outlet port to the second-nozzle-body inlet port; and
- with the second-nozzle separator plate inserted between and separating the first-part faying surface and the second-part faying surface, receiving a portion of the volume of adhesive into the second-nozzle-body inlet port.

* * * * *